(12) United States Patent
Da Veiga et al.

(10) Patent No.: US 12,659,448 B2
(45) Date of Patent: Jun. 16, 2026

(54) IMAGE DISPLAY WITHIN A THREE-DIMENSIONAL ENVIRONMENT

(71) Applicant: Apple Inc., Cupertino, CA (US)

(72) Inventors: Alexandre Da Veiga, San Francisco, CA (US); Tobias Rick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 18/238,750

(22) Filed: Aug. 28, 2023

(65) Prior Publication Data

US 2023/0403386 A1      Dec. 14, 2023

Related U.S. Application Data

(63) Continuation of application No. PCT/US2022/019412, filed on Mar. 9, 2022.
(Continued)

(51) Int. Cl.
*H04N 13/282* (2018.01)
*H04N 13/128* (2018.01)
(Continued)

(52) U.S. Cl.
CPC ......... *H04N 13/282* (2018.05); *H04N 13/128* (2018.05); *H04N 13/261* (2018.05);
(Continued)

(58) Field of Classification Search
None
See application file for complete search history.

(56) References Cited

U.S. PATENT DOCUMENTS 10,155,166 B1 * 12/2018 Taylor ..................... A63F 13/26
10,419,716 B1 * 9/2019 Tanumihardja ..... A63F 13/5252
(Continued)

FOREIGN PATENT DOCUMENTS

| JP | 6771006 B2 * | 10/2020 |
| WO | 2019063976 A1 | 4/2019 |
| WO | 2020017435 A1 | 1/2020 |

OTHER PUBLICATIONS

European Patent Office (ISA/EP), International Search Report and Written Opinion of the International Searching Authority, International Application No. PCT/US2022/019412, 12 pages, Jun. 22, 2022.

*Primary Examiner* — Mohammed Jebari
(74) *Attorney, Agent, or Firm* — Thompson Hine LLP

(57)      ABSTRACT

Various implementations disclosed herein include devices, systems, and methods that provides a view of a three-dimensional (3D) environment that includes a projection of a 3D image, such as a multi-directional stereo image or video content. For example, an example process may include obtaining a three-dimensional (3D) image including a stereoscopic image pair including left eye content corresponding to a left eye viewpoint and right eye content corresponding to a right eye viewpoint, generating a projection of the 3D image within a 3D environment by projecting portions of the 3D image to form a shape within the 3D environment, the shape based on an angle of view of the 3D image, where the 3D environment includes additional content separate from the 3D image, and providing a view of the 3D environment including the projection of the 3D image.

19 Claims, 12 Drawing Sheets

Related U.S. Application Data

(60) Provisional application No. 63/189,841, filed on May 18, 2021, provisional application No. 63/159,505, filed on Mar. 11, 2021.

(51) Int. Cl.

| | |
|---|---|
| *H04N 13/261* | (2018.01) |
| *H04N 13/332* | (2018.01) |
| *H04N 13/344* | (2018.01) |
| *H04N 13/383* | (2018.01) |

(52) U.S. Cl.
CPC ......... *H04N 13/344* (2018.05); *H04N 13/383* (2018.05); *H04N 13/332* (2018.05)

(56) References Cited

U.S. PATENT DOCUMENTS

| | | | | |
|---|---|---|---|---|
| 2014/0285486 | A1* | 9/2014 | Chang | G06T 7/579 |
| | | | | 345/420 |
| 2015/0049004 | A1* | 2/2015 | Deering | H04N 13/344 |
| | | | | 345/8 |
| 2016/0021367 | A1* | 1/2016 | Yoon | G09G 3/03 |
| | | | | 348/59 |
| 2016/0086386 | A1* | 3/2016 | Son | G02B 27/017 |
| | | | | 345/633 |
| 2016/0234482 | A1* | 8/2016 | Bickerstaff | H04N 13/128 |
| 2016/0260251 | A1* | 9/2016 | Stafford | G02B 27/0179 |
| 2016/0307372 | A1* | 10/2016 | Pitts | H04N 23/957 |
| 2016/0325683 | A1* | 11/2016 | Hayashi | G02B 27/0179 |
| 2016/0337630 | A1* | 11/2016 | Raghoebardajal | A63F 13/212 |
| 2016/0349510 | A1 | 12/2016 | Miller | |
| 2016/0370970 | A1 | 12/2016 | Chu | |
| 2016/0371884 | A1* | 12/2016 | Benko | G06T 19/006 |
| 2017/0208292 | A1* | 7/2017 | Smits | G03H 1/0005 |
| 2017/0244948 | A1* | 8/2017 | Pang | H04N 23/957 |
| 2018/0165830 | A1* | 6/2018 | Danieau | G06F 3/012 |
| 2018/0181196 | A1 | 6/2018 | Lee | |
| 2018/0270464 | A1* | 9/2018 | Harviainen | H04N 13/344 |
| 2018/0321894 | A1 | 11/2018 | Paulovich | |
| 2019/0020869 | A1* | 1/2019 | Perreault | H04N 13/383 |
| 2019/0118091 | A1* | 4/2019 | Taylor | A63F 13/213 |
| 2019/0356894 | A1* | 11/2019 | Oh | H04N 21/234345 |
| 2020/0045300 | A1 | 2/2020 | Trevor | |
| 2020/0082632 | A1* | 3/2020 | Burns | G06T 19/20 |
| 2020/0218072 | A1* | 7/2020 | Inatani | H04N 7/183 |
| 2020/0296354 | A1* | 9/2020 | Bickerstaff | G02B 27/017 |
| 2020/0304769 | A1* | 9/2020 | Bickerstaff | G02B 30/34 |
| 2020/0396493 | A1* | 12/2020 | Berger | H04N 21/4728 |
| 2021/0154579 | A1* | 5/2021 | Ikenoue | G09G 5/00 |
| 2021/0183156 | A1* | 6/2021 | Kim | G06F 3/011 |
| 2021/0195157 | A1* | 6/2021 | Stokking | H04N 13/344 |
| 2021/0354036 | A1* | 11/2021 | Swann | A63F 13/86 |
| 2021/0385422 | A1* | 12/2021 | Varekamp | H04N 13/398 |
| 2022/0026736 | A1* | 1/2022 | Miller | H04N 13/39 |

* cited by examiner

Obtain a three-dimensional (3D) image ⟋ 802

Generate a projection of the 3D image within a 3D environment by projecting portions of the 3D image to form a shape within the 3D environment, where the 3D environment includes additional content separate from the 3D image ⟋ 804

Provide a view of the 3D environment including the projection of the 3D image ⟋ 806

900

1200

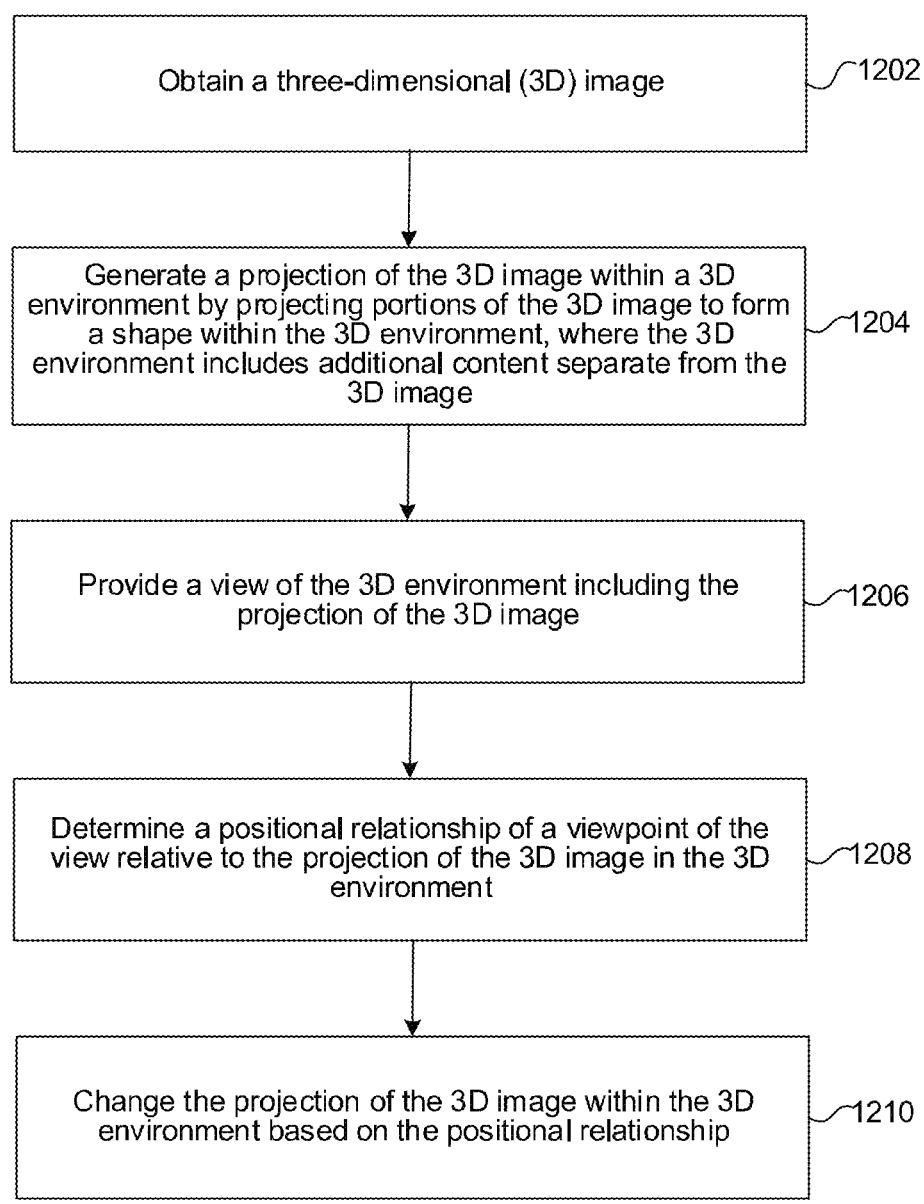

Obtain a three-dimensional (3D) image — 1202

Generate a projection of the 3D image within a 3D environment by projecting portions of the 3D image to form a shape within the 3D environment, where the 3D environment includes additional content separate from the 3D image — 1204

Provide a view of the 3D environment including the projection of the 3D image — 1206

Determine a positional relationship of a viewpoint of the view relative to the projection of the 3D image in the 3D environment — 1208

Change the projection of the 3D image within the 3D environment based on the positional relationship — 1210

FIG. 12

IMAGE DISPLAY WITHIN A THREE-DIMENSIONAL ENVIRONMENT

CROSS-REFERENCE TO RELATED APPLICATIONS

This patent application is a continuation of International Application No. PCT/US2022/019412 filed Mar. 9, 2022, which claims priority to U.S. Provisional Application No. 63/159,505 filed Mar. 11, 2021, and U.S. Provisional Application No. 63/189,841 filed May 18, 2021, all entitled IMAGE DISPLAY WITHIN A THREE-DIMENSIONAL ENVIRONMENT, each of which is incorporated herein by this reference in its entirety.

TECHNICAL FIELD

The present disclosure generally relates to techniques for providing content with electronic devices, and in particular, to systems, methods, and devices for providing visual content in views of three-dimensional (3D) environments.

BACKGROUND

In photography, "angle of view" refers to the angular extent of a given scene that is imaged by a camera. For example, a digital camera with a standard 80 mm lens may provide a 40° angle of view, while a digital camera with a wide-angle lens may provide a 64°-84° angle of view. Standard and wide-angle lens image content is generally flattened onto rectangular images, which are then viewed in this flat format. Cameras can also be used to capture spherical images (e.g., 180° images, 360° images, etc.), referred to herein as "sphere-based images," that represent light received (e.g., reflected) from the physical environment from different angular directions relative to the capturing viewpoint. The angle of view of such sphere-based images is typically either 180° or 360°, although other angles of view are possible. While such content may be stored in a flat format (e.g., using an equirectangular projection), such flat formats do not generally provide a desirable viewing experience because the flattening introduces the appearance of distortions and/or reduces realism. Instead, some devices enable such sphere-based images to be viewed in a fully immersive experience, e.g., in which a device exclusively displays the content of a sphere-based image in full size, as if the image content were all around the viewer. It may be desirable, however, to provide additional and/or alternative viewing experiences.

SUMMARY

It is desirable to enable improved user content experiences. Various implementations disclosed herein include devices, systems, and methods that provide a view a three-dimensional (3D) environment that includes a portal (e.g., a "bubble view", a "snow globe view", or the like) of sphere-based image (or video) content. For example, a 180° image/video may be projected to form a shape (e.g., the inside of an empty half-sphere) that is displayed in 3D space. Rather than providing fully immersive views of the image, the 3D image/video is displayed at a relatively small viewing portal at a fixed position within a larger 3D environment. Providing a smaller (non-immersive) view at a fixed position enables numerous experiences and may enhance the user's comfort. The shape of the portal may be non-planar, e.g., it may be curved to correspond to the angle of view of the image content. For example, the 3D image content may be curved like the inside of an empty half-sphere to correspond to the angle of view of the image. The 3D image may be any stereo image pair, e.g., such that differences between a right eye view and a left eye view enable the viewer to perceive depth within the image content that is depicted at the portal. For example, the 3D image may be any type of stereo image pair such as 180° half sphere, rectilinear 90°, equirectangular projections, and the like, such that any image content with a known projection will work, as long as the content includes a stereo pair.

In some implementations, additional features are provided that enhance user comfort and enable changing the immersion of the image experience. The additional features may be based on controlling parallax of a stereoscopic projection, a user's or device's position with respect to the projection, a gaze direction of the user, and the like. For example, a device (e.g., a handheld, laptop, desktop, or head-mounted device (HMD)) provides views of a 3D environment (e.g., a visual and/or auditory experience) to the user and obtains, with a sensor, physiological data (e.g., gaze characteristics) and motion data (e.g., controller moving the avatar, head movements, etc.) associated with a response of the user. Based on the obtained physiological data, the techniques described herein can determine a user's vestibular cues during the viewing of a 3D environment (e.g., an XR environment) by tracking the user's gaze characteristic(s) and other interactions (e.g., user movements in the physical environment). Based on the vestibular cues, the techniques can detect a user's position and/or interactions with a projection of a 3D image and provide a different set of views (e.g., a full immersive experience to a portal) to improve a user experience while viewing the 3D environment.

In some implementations, the portal may change orientation to be oriented towards the user as the user moves around the 3D environment. For example, as a user walks around the 3D environment, the portal can change in appearance (e.g., size, shape, etc.) and/or move with the user as he or she moves around the physical environment. The 3D environment may be an XR environment and may thus be based on the physical environment surrounding the user, a virtual environment, or a combination of the real and virtual environments.

In some implementations, the level of immersion image may change, for example, based on how close the user is to the portal within the 3D environment. For example, as a user gets closer to the portal, the portal may increase in size. Additionally, if a user walks into the location of the portal, the user may be fully immersed within the stereo photo/video content.

In some implementations, visual effects may be provided within a stereo image or video content based on head movements to further reduce motion sickness (e.g., creating a faux parallax for 3D photos based on a correspondence to head motion, such as creating an illusion). For example, the 3D photo being projected within the shape ("bubble view"/ "snow globe view") may have additional content outside of the field of view of the shape. Based on detecting head motion (e.g., horizontal, vertical, etc.), the perspective and field of view of the 3D photo may be changed (e.g., to look at additional content in the 3D photo not currently in view). Additionally, different visual effects may be included, based on these detected head motions. For example, based on the head motion, the entire texture of the 3D photo may be changed based on the movement. The changes maybe mapped to texture animation, panning to texture, and/or rotational warp (e.g., rotation in texture space). Additionally, the visual effects may be based on applying a fixed depth to the motion (e.g., planar homography) for an image-to-image operation. In some implementations, the visual effects may be based on a speed of the head movement. For example, based on a movement threshold, if the head moves too quickly because the user wants to look away from the view of the 3D photo (e.g., within the snow globe view). In some implementations, the visual effects may include blurring, fading out, fading to greyscale, or going from a stereoscopic view to a monoscopic view.

In general, one innovative aspect of the subject matter described in this specification can be embodied in methods that include the actions of obtaining a three-dimensional (3D) image, generating a projection of the 3D image within a 3D environment by projecting portions of the 3D image to form a shape having a non-planar (e.g., curved, semi-spherical, etc.) surface within the 3D environment, wherein the 3D environment includes additional content separate from the 3D image, and providing a view of the 3D environment including the projection of the 3D image.

These and other embodiments can each optionally include one or more of the following features.

In some aspects, the 3D image includes a stereoscopic image pair including left eye content corresponding to a left eye viewpoint and right eye content corresponding to a right eye viewpoint. In some aspects, the 3D image includes stereo video content stored as equirectangular projections. In some aspects, the 3D image includes a stereo photograph, a stereogram, a 3D video, flickering stereo images, a random dot stereogram, an anaglyph, or a lenticular image. In some aspects, the actions further include determining a position to project the 3D image within the 3D environment based on a viewpoint of the view of the 3D environment.

In some aspects, a position of the projection of the 3D image within the 3D environment is constant as a viewpoint of the view of the 3D environment changes. In some aspects, an orientation of the projection of the 3D image changes to face a viewpoint as a viewpoint of the view of the 3D environment changes. In some aspects, the shape is based on an angle of view of the 3D image.

In some aspects, the actions further include adjusting the projection to control parallax. In some aspects, adjusting the projection to control parallax is based on a gaze direction of a user of the electronic device relative to the position of the projection of the 3D image within the 3D environment. In some aspects, adjusting the projection to control parallax includes determining a metric based on depth of content of the 3D image, and performing a pixel shift, warp, or movement of the projection of the 3D image based on the metric. In some aspects, the actions further include further adjusting the projection to reduce pixel disparity between a left eye viewpoint and a right eye viewpoint.

In some aspects, the actions further include determining a positional relationship of a viewpoint of the view relative to the projection of the 3D image in the 3D environment, and changing a level of immersion based on the positional relationship.

In some aspects, the projection of the 3D image is within a shape of a sphere, changing a level of immersion based on the positional relationship includes changing a view of the projection of the 3D image from a perspective of outside view of the sphere to a perspective from an inside view of the sphere. In some aspects, changing a level of immersion based on the positional relationship includes changing a view from an inside view of the projection of the 3D image to an outside view of the projection of the 3D image.

In some aspects, the 3D image includes 360 degree content, and changing a level of immersion based on the positional relationship includes changing from a first view that includes a portion of the projection of the 3D image when the positional relationship of the viewpoint is outside of the projection of the 3D image to a second view that includes all of the projection of the 3D image when the positional relationship of the viewpoint is inside of the projection of the 3D image.

In some aspects, the projection of the 3D image depicts a portion of the 3D image such that remaining portions of the 3D image are cropped out of the projection In some aspects, the method further includes determining a positional relationship of a viewpoint of the view relative to the projection of the 3D image in the 3D environment, and changing the projection of the 3D image within the 3D environment based on the positional relationship.

In some aspects, changing the projection of the 3D image includes causing some of the remaining portions of the 3D image to be depicted based on the positional relationship satisfying a first criterion. In some aspects, changing the projection of the 3D image includes providing a visual effect to the projection of the 3D image based on the positional relationship satisfying a second criterion In some aspects, the visual effect includes blurring at least a portion of the projection of the 3D image, fading out content of the projection of the 3D image, or converting at least a portion of color content of the projection of the 3D image to grayscale. In some aspects, the projection of the 3D image includes a stereoscopic view of the 3D image, and the visual effect includes a change from the stereoscopic view to a monoscopic view of the 3D image.

In some aspects, the visual effect is based on a rate of change of the positional relationship. In some aspects, the changing of the projection of the 3D image is based on applying a warp to a left frame and a right frame of the 3D image using a fixed depth. In some aspects, the projection of the 3D image depicts a portion of the 3D image such that remaining portions of the 3D image are cropped out of the projection.

In some aspects, the method further includes determining a positional relationship of a viewpoint of the view relative to the projection of the 3D image in the 3D environment, and changing the projection of the 3D image within the 3D environment based on the positional relationship. In some aspects, changing the projection of the 3D image includes causing some of the remaining portions of the 3D image to be depicted based on the positional relationship satisfying a first criterion. In some aspects, the changing of the projection of the 3D image is based on applying a warp to a left frame and a right frame of the 3D image using a fixed depth.

In some aspects, changing the projection of the 3D image includes providing a visual effect to the projection of the 3D image based on the positional relationship satisfying a second criterion. In some aspects, the visual effect includes blurring at least a portion of the projection of the 3D image, fading out content of the projection of the 3D image, or converting at least a portion of color content of the projection of the 3D image to grayscale. In some aspects, the projection of the 3D image includes a stereoscopic view of the 3D image, and the visual effect includes a change from the stereoscopic view to a monoscopic view of the 3D image. In some aspects, the visual effect is based on a rate of change of the positional relationship.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 illustrates example views of the image of FIG. 3 provided by the device of FIG. 2, the views including a left eye view and a right eye view in accordance with some implementations.

FIG. 12 is a flowchart representation of an exemplary method for visually representing a 3D environment including the projection of a 3D image within the 3D environment in accordance with some implementations.

Figures 1, 2:
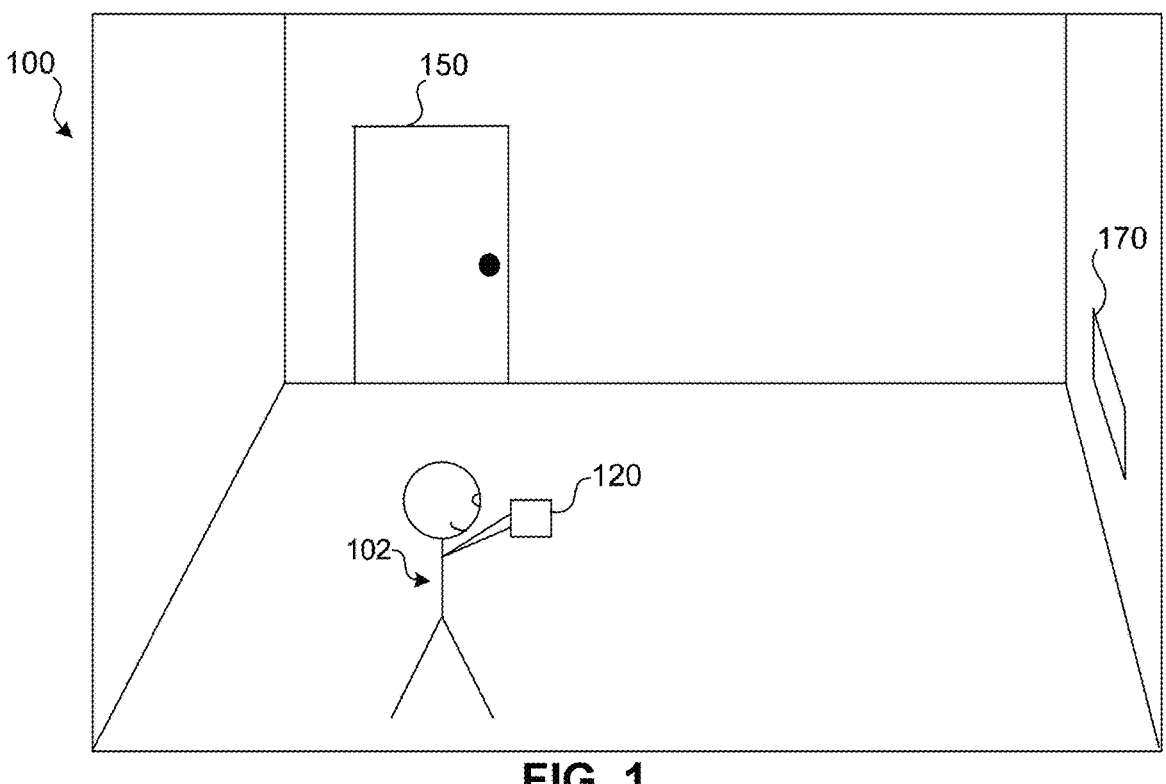
FIG. 1 illustrates an exemplary electronic device operating in a physical environment in accordance with some implementations.
FIG. 2 illustrates an exemplary three-dimensional (3D) environment generated based on the physical environment of FIG. 1 and a projection of a 3D image within the 3D environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 120 operating in a physical environment 100 in accordance with some implementations. The physical environment 100 includes a door 150 and a wall hanging 170. Additionally, physical environment 100 includes user 102 holding electronic device 120. The electronic device 120 includes one or more cameras or other sensors that can be used to capture or generate representations of the door 150, the wall hanging 170, and other objects of the physical environment 100. In some implementations, the device 120 is configured to present a computer-generated environment to the user 102. The presented environment can include extended reality (XR) features.

In some implementations, the device 120 is a handheld electronic device (e.g., a smartphone or a tablet). In some implementations, the device 120 is a near-eye device such as a head worn device. The device 120 utilizes one or more display elements to present views. For example, the device 120 can display views that include content in the context of an extended reality (XR) environment. In some implementations, the device 120 may enclose the angle-of-view of the user 102. In some implementations, the functionalities of device 120 are provided by more than one device. In some implementations, the device 120 communicates with a separate controller or server to manage and coordinate an experience for the user. Such a controller or server may be located in or may be remote relative to the physical environment 100.

FIG. 2 illustrates an exemplary three-dimensional (3D) environment 200 generated based on the physical environment 100 of FIG. 1 and a projection of a 3D image within the 3D environment 200. The projection of a 3D image is also referred to herein as a "portal". The 3D environment 200 includes representations 250 and 270 of the door 150 and wall hanging 170, respectively, of the physical environment 100. The 3D environment 200 also includes visual content 285 that is displayed to form a virtual shape 280 (e.g., a 3D virtual shape such as a half-sphere, aka a "snow globe" view). The visual content 285 being displayed to form the virtual shape 280 constitutes the portal (e.g., a projection of an image), as discussed herein.

The electronic device 120 provides views of the 3D environment 200 that include depictions of the 3D environment from a viewer position 220, which in this example is determined based on the position of the electronic device 120 in the physical environment 100. Thus, as the user moves the electronic device 120 relative to the physical environment 100, the viewer position 220 corresponding the electronic device 120 position is moved relative to the 3D environment 200. The view of the 3D environment provided by the electronic device changes based on changes to the viewer position 220 relative to the 3D environment 200. In some implementations, the 3D environment 200 does not include representations of the physical environment 100, for example, including only virtual content corresponding to a virtual reality environment.

In the example of FIGS. 1 and 2, the electronic device 120 is illustrated as a single, hand-held device. The electronic device 120 may be a mobile phone, a tablet, a laptop, so forth. In some implementations, electronic device 120 is worn by a user. For example, electronic device 120 may be a watch, a head-mounted device (HMD), head-worn device (glasses), headphones, an ear mounted device, and so forth. In some implementations, functions of the device 120 are accomplished via two or more devices, for example a mobile device and base station or a head mounted display and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic device 120 may communicate with one another via wired or wireless communications.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Figure 3:
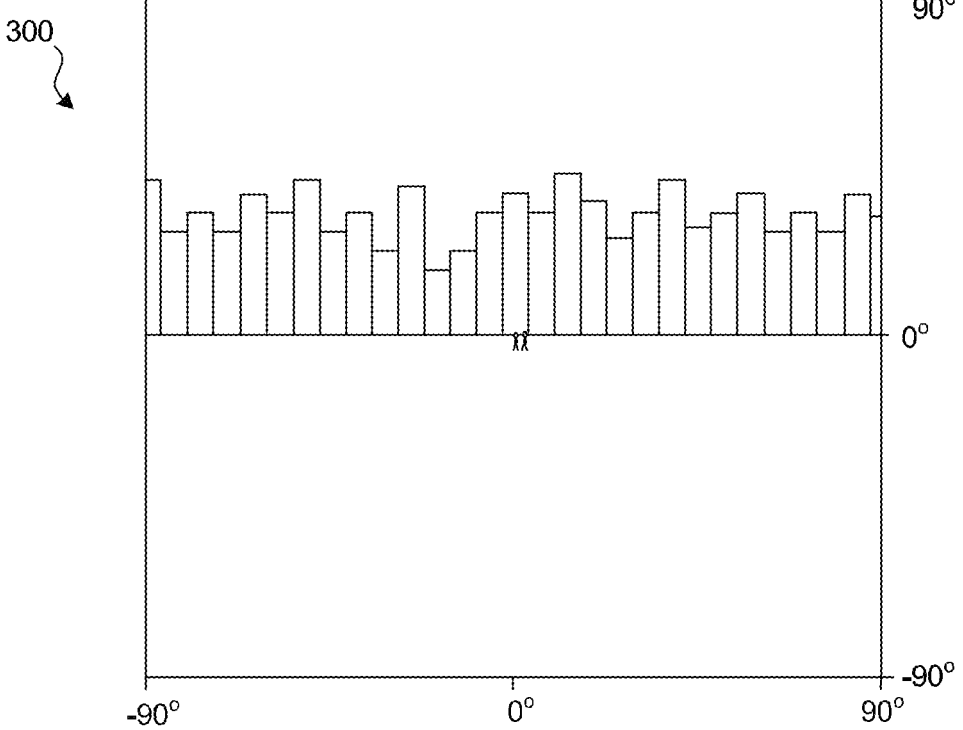
FIG. 3 illustrates an example of an equirectangular representation of an image in accordance with some implementations.
Figure 4:
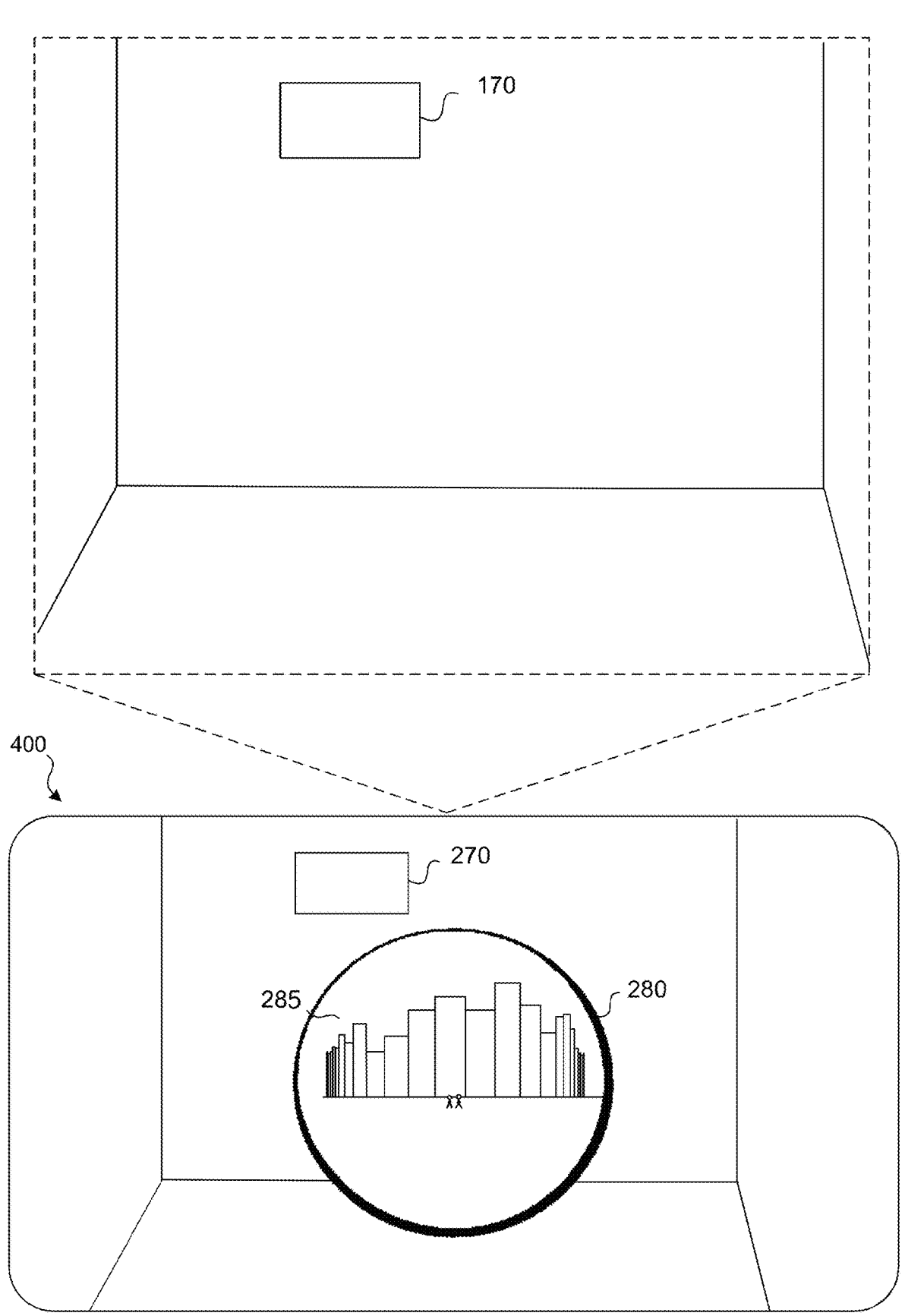
FIG. 4 illustrates an example view of the image of FIG. 3 provided by the device of FIG. 2 in accordance with some implementations.

FIG. 3 illustrates an example of an equirectangular representation 300 of an image in accordance with some implementations. In particular, the equirectangular representation 300 represents an example image of two people with a background of a city (e.g., a group of buildings). FIG. 4 illustrates an example view 400 of the representation 300 of FIG. 3 provided by the device of FIG. 2, in accordance with some implementations. For example, the representation 300 is illustrated as visual content 285 that is displayed on a surface of a virtual shape 280 (e.g., a 3D virtual shape such as a half-sphere, aka a "snow globe" view) on a display of an electronic device (e.g., electronic device 120). For example, the example view 400 represents an example viewpoint of the user 120 that he or she would be viewing in FIG. 2 of an image (e.g., visual content 285, i.e., an image of two people with a background of a city) provided within a portal (e.g., virtual shape 280).

The portal view (e.g., a virtual image/video viewer application window) in the example view 400 provides a "snow globe" effect for the photo/video that is projected within. The visual content 285 may include a 3D image that may be one or more images, a video, an animation, or other visible content that is recorded or created. The visual content 285 may be non-linear content captured from a camera such as a camera with a fisheye lens. Such a camera may capture non-linear content corresponding to the shape of the lens without flattening the content and this non-linear content may be positioned in a 3D environment, e.g., on a corresponding non-planar (e.g., curved, semi-spherical, etc.) surface of a shape. For example, the visual content 285 may be displayed on a portion of an inside or outside of an approximately spherical shape (which may be invisible). Non-linear visual content may be captured and displayed without distortion or adjustment that would otherwise be used to present the content on a planar surface. In some implementations, the visual content 285 may include a 180° stereo image pair or 180° stereo video content stored as equirect-angular projections. In some implementations, spatialized depth data may also be obtained and used to enable a spatialized view.

Figure 5:
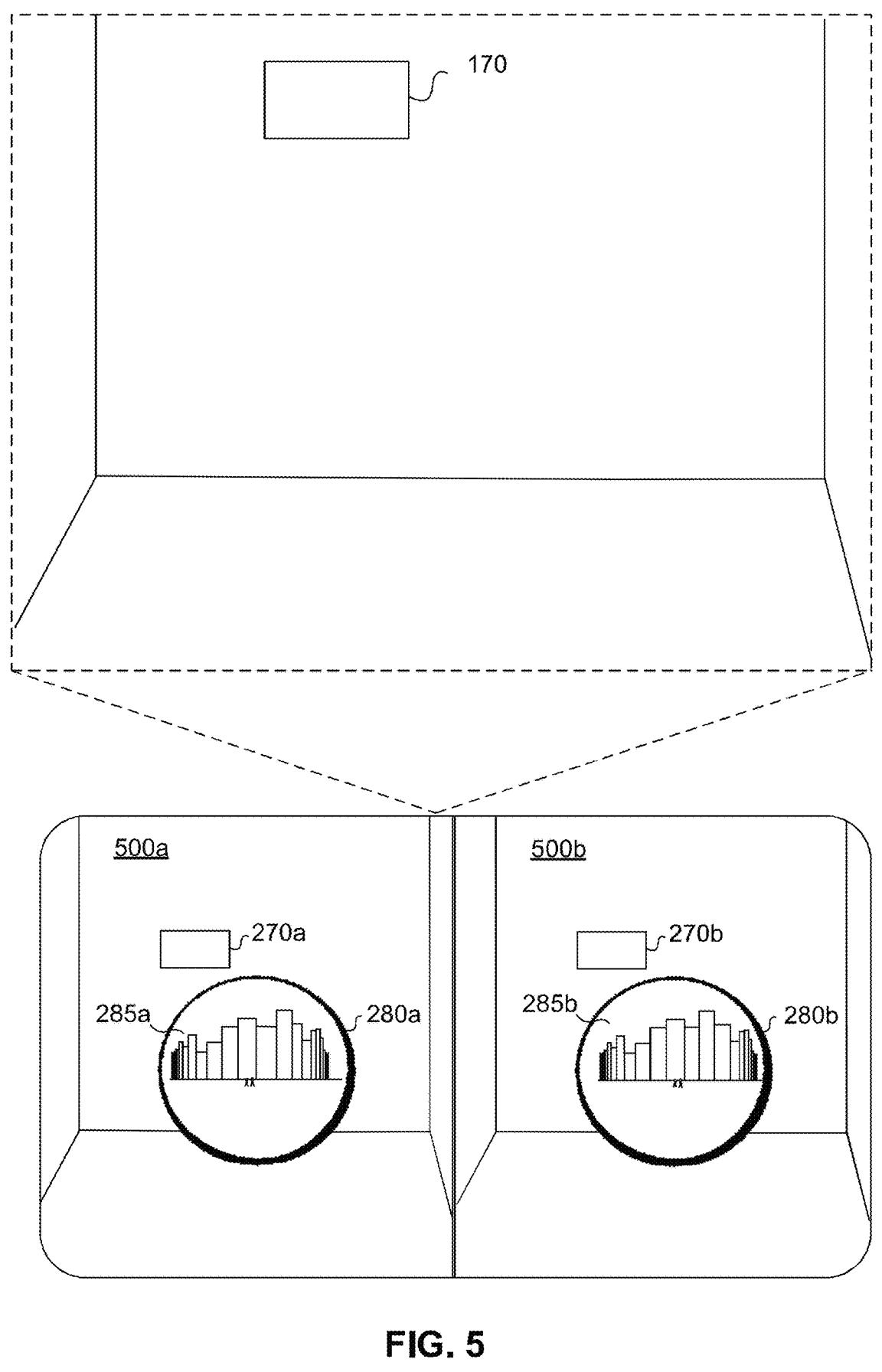

FIG. 5 illustrates example views 500a and 500b of the representation 300 of FIG. 3 provided by the device of FIG. 2, where the views 500a and 500b include a left eye view and a right eye view, respectively, in accordance with some implementations. For example, the representation 300 of example view 500a is illustrated as visual content 285a that is displayed on a surface of a virtual shape 280a (e.g., a 3D virtual shape such as a half-sphere, aka a "snow globe" view) on a display of an electronic device (e.g., electronic device 120). For example, the example view 500a represents an example left-eye viewpoint of the user 120 that he or she would be viewing in FIG. 1 of an image (e.g., the photo of two people with a background of a city) within a portal (e.g., virtual shape 280a). The visual content 285b in the second view 500b represents an example right-eye viewpoint of the user 120 and is at a different location (compared to the first view 500a) based on the different viewpoint (e.g., pupillary distance with respect to the convergence of the user's gaze upon an object of interest). Thus, if viewed on an HMD, the combination of example views 500a and 500b would present a stereo image to a user.

Figure 6:
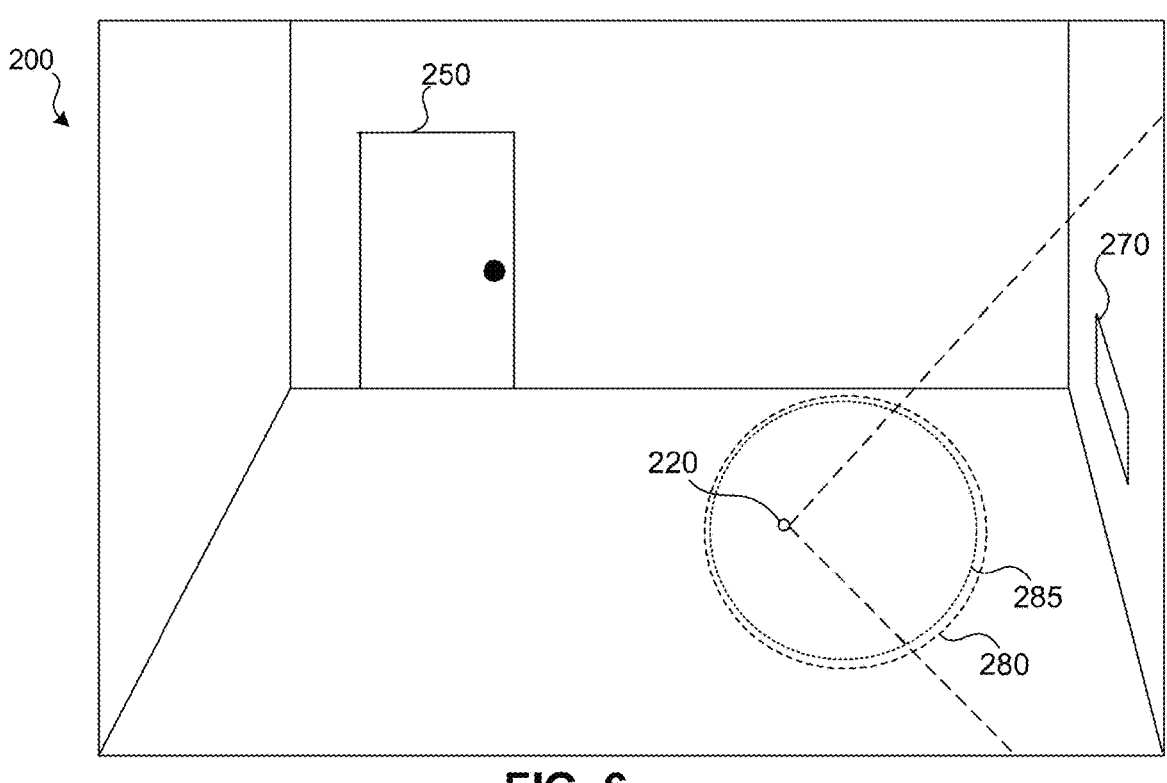
FIG. 6 illustrates an exemplary 3D environment generated based on the physical environment of FIG. 1 and a projection of a 3D image within the 3D environment in accordance with some implementations.
Figure 7:
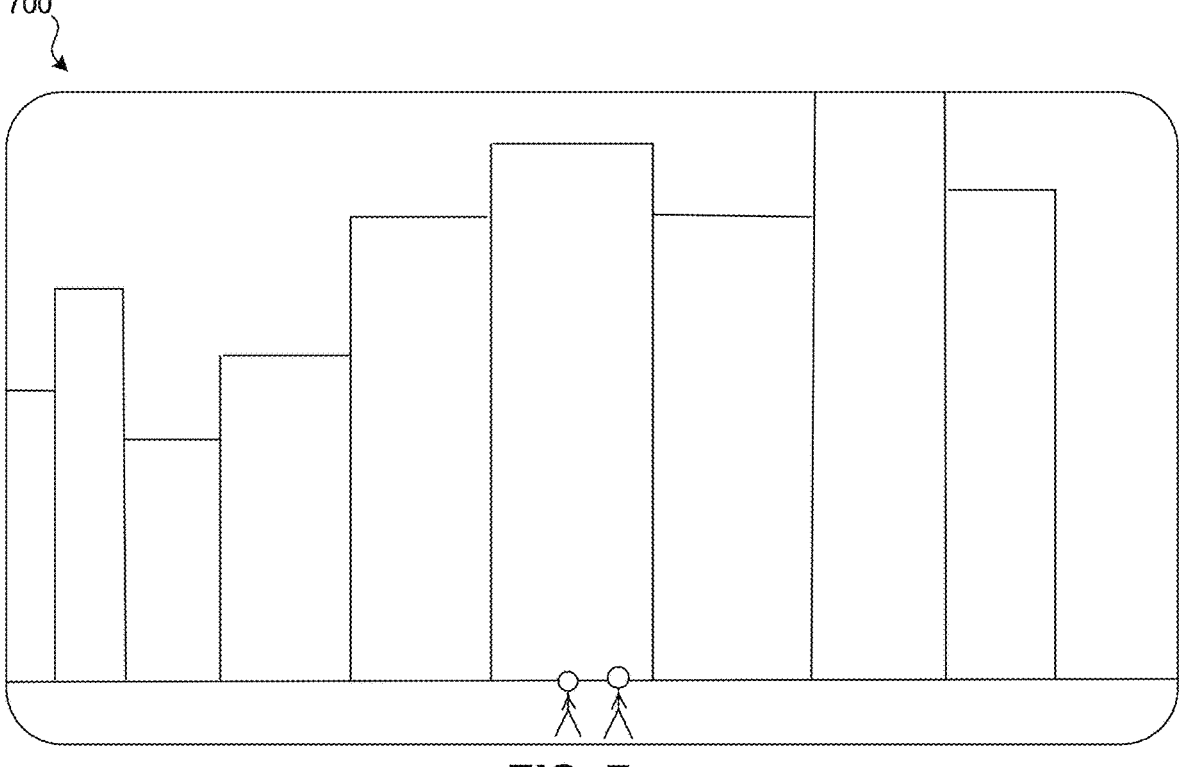
FIG. 7 illustrates an example view of the image of FIG. 3 provided by the device of FIG. 6 in accordance with some implementations.

FIG. 6 illustrates an exemplary 3D environment 200 generated based on the physical environment 100 of FIG. 1 and a projection of a 3D image (e.g., a portal) within the 3D environment 200. FIG. 7 illustrates an example view 700 of the representation 300 of FIG. 3 provided by the device and with respect to viewer position 220 of FIG. 6, in accordance with some implementations. The 3D environment 200 includes representations 250 and 270 of the door 150 and wall hanging 170, respectively, of the physical environment 100. The 3D environment 200 also includes visual content 285 that is displayed on a surface of a virtual shape 280 (e.g., a 3D virtual shape such as a sphere). The electronic device 120 provides views of the 3D environment 200 that include depictions of the 3D environment from a viewer position 220, which in this example is determined based on the position of the electronic device 120 in the physical environment 100. In this particular example of FIG. 6, the viewer position 220 is determined to be inside of an area or volume defined by the virtual shape 280. Based on this positional relationship, the visual content 285 would be displayed as a full immersion based on the visual display capabilities of the device 120. For example, a full immersion display effect for a handheld electronic device (e.g., a smartphone, a tablet, etc.) may include a full screen display as illustrated in example view 700 of FIG. 7. Alternatively, full immersion for an HMD may include 180° (or greater) view for the user such that the user is immersed with the visual content 285.

In some examples where visual content 285 was previously displayed on an outer surface of virtual shape 280 when viewer position 220 was outside an area or volume defined by virtual shape 280, the visual content 285 can be transitioned to an inner surface of virtual shape 280 when viewer position 220 enters the area or volume defined by virtual shape 280. In some examples, the portion of virtual shape 280 on which the visual content 285 is presented can change based on whether viewer position 220 is within an area or volume defined by virtual shape 280. For example, when viewer position 220 is outside of virtual shape 280, the visual content 285 can be presented on an outer surface of a front portion of virtual shape 280 toward viewer position 220. However, when viewer position 220 transitions to an area or volume defined by virtual shape 280, the visual content 285 can be presented on an inner surface of a back portion of virtual shape 280 away from the previous viewer position (or inner surface of a portion of virtual shape 280 opposite the previous presentation portion). In addition, visual content that was not previously displayed when viewer position 220 was outside of virtual shape 280 can be presented on an inner surface of the front portion of virtual shape 280 (e.g., content showing the 3D environment behind the user).

In other examples, when viewer position 220 is outside of virtual shape 280, the visual content 285 can be presented on an inner surface of a back portion of virtual shape 280 toward viewer position 220. In these examples, the front portion of virtual shape 280 can include no visual content or be otherwise made transparent such that the inner surface of the back portion of virtual shape 280 is visible from viewer position 220. When viewer position 220 transitions to an area or volume defined by virtual shape 280, the visual content 285 on the back portion of virtual shape 280 can remain, but visual content that was not previously displayed when viewer position 220 was outside virtual shape 280 can be presented on an inner surface of the front portion of virtual shape 280 (e.g., content showing the 3D environment behind the user).

In some examples, the amount of surface occupied by visual content 285 can depend on an amount of visual content (e.g., image, video, animation, or the like) that is represented by visual content 285 (e.g., an angle of view of an image, video, or animation being shown).

Figure 8:
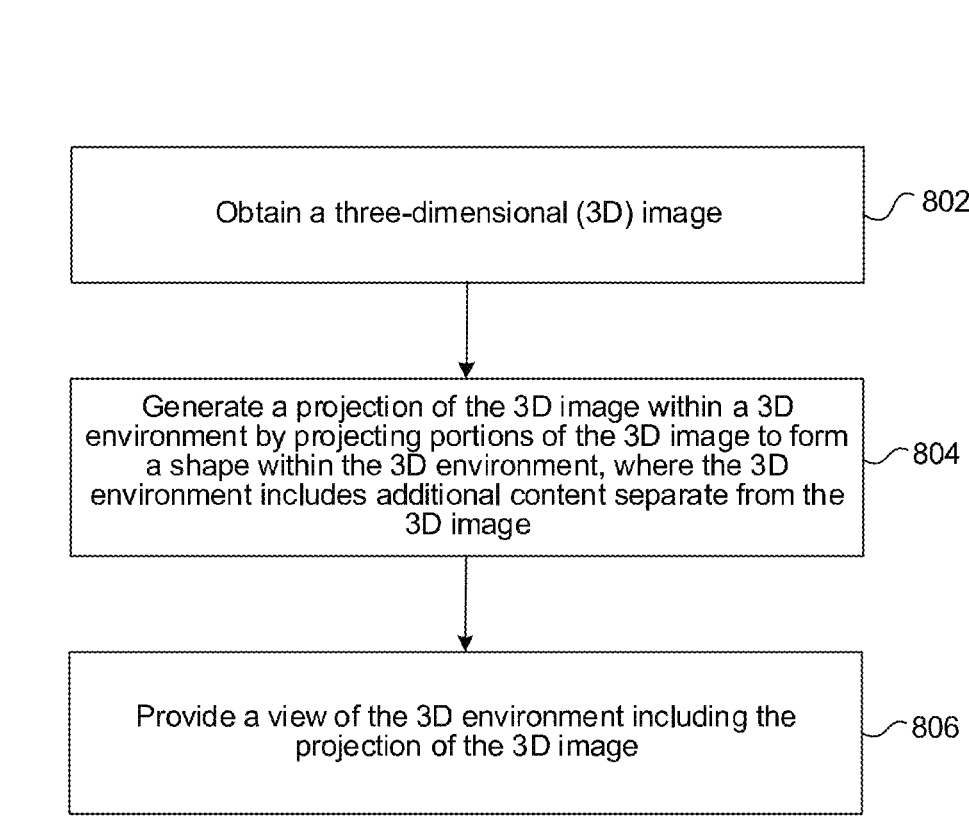
FIG. 8 is a flowchart representation of an exemplary method for visually representing a 3D environment including the projection of a 3D image within the 3D environment in accordance with some implementations.

FIG. 8 is a flowchart illustrating an exemplary method 800. In some implementations, a device such as electronic device 120 (FIG. 1) performs the techniques of method 800 to provide a view of a 3D environment including a projection of a 3D image (e.g., a virtual "portal") within the 3D environment. In some implementations, the techniques of method 800 are performed on a mobile device, desktop, laptop, HMD, ear-mounted device or server device. In some implementations, the method 800 is performed by processing logic, including hardware, firmware, software, or a combination thereof. In some implementations, the method 800 is performed on a processor executing code stored in a non-transitory computer-readable medium (e.g., a memory).

At block 802, the method 800 obtains a 3D image. The 3D image may be one or more images, a video, an animation, or other visible content that is recorded or created. The 3D image may be non-linear content captured from a camera such as a camera with a fisheye lens. Such a camera may capture non-linear content corresponding to the shape of the lens without flattening the content and this non-linear content may be positioned in a 3D environment, e.g., on a corresponding non-planar (e.g., curved, semi-spherical, etc.) surface of a shape. For example, the content may be displayed on a portion of an inside or outside of an approximately spherical shape (which may be invisible). Non-linear visual content may be captured and displayed without distortion or adjustment that would otherwise be used to present the content on a planar surface.

In some implementations, the 3D image includes a stereoscopic image pair including left eye content corresponding to a left eye viewpoint and right eye content corresponding to a right eye viewpoint. In some implementations, the 3D image may include a stereo image pair or stereo video content (e.g., 180° stereo image content) stored as equirectangular projections. For example, as illustrated in FIG. 5, a stereo image pair of 3D images is displayed to the user (e.g., view 500a is a left-eye view and view 500b is a right-eye view). In some implementations, spatialized depth data may also be obtained and used to enable a spatialized view. In some implementations, the 3D image includes a stereo photograph, a stereogram, flickering stereo images, a random dot stereogram, an anaglyph, a lenticular image, or the like. In some implementations, the 3D image may be any stereo image pair, e.g., such that differences between a right eye view and a left eye view enable the viewer to perceive depth within the image content that is depicted at the portal. For example, the 3D image may be any type of stereo image pair such as 180° half sphere, rectilinear 90°, equirectangular projections, and the like, such that any image content with a known projection will work, as long as the content includes a stereo pair.

At block 804, the method 800 generates a projection of the 3D image within a 3D environment by projecting portions (pixels) of the 3D image to form a shape (e.g., a half-sphere) within the 3D environment, where the 3D environment includes additional content separate from the 3D image. For example, additional content separate from the 3D image by include virtual shape 280. In some implementations, the shape (e.g., virtual shape 280) is based on an angle of view of the 3D image (e.g., a half-sphere is used for a 180° angle of view). The projection of the 3D image (e.g., visual content 285) is sometimes referred to herein as a portal (e.g., aka a "snow globe" view).

At block 806, the method 800 provides a view of the 3D environment including the projection of the 3D image. The 3D environment may be any type of environment including XR environments that include representations of real or virtual objects. For example, as illustrated in view 400 of FIG. 4, a view of an electronic device provides a view of the 3D environment (e.g., a viewpoint towards the representation 270 of the wall hanging 170 of example environment 100) which includes the projection of an image (e.g., visual content 285) within a portal (e.g., virtual shape 280).

In some implementations, the method 800 further includes determining a position to project the 3D image within the 3D environment based on a viewpoint of the view of the 3D environment. For example, the portal (e.g., virtual shape 280) may be world-locked and fixed to a particular location within the 3D environment, or may be head-locked and fixed to a particular viewpoint of the user (e.g., while wearing an HMD, the portal stays at the same viewpoint as the user moves around the 3D environment). In some implementations, a position of the 3D image within the 3D environment is constant as a viewpoint of the view of the 3D environment changes (e.g., world-locked positioning). For example, as the user moves around, the shape (e.g., half-sphere, aka "snow globe") stays in a fixed position. In some implementations, an orientation of the 3D image changes to face a viewpoint as a viewpoint of the view of the 3D environment changes. For example, the 3D image changes orientation to constantly face the user as the user walks around the real-world, physical environment (e.g., head-locked positioning).

In some implementations, a position or orientation of a portal of sphere-based image (or video) content within a 3D environment is based on one or more criteria regarding the content, the user, or the environment. For example, the orientation of a main axis of a portal may be aligned with user's viewing direction. Such alignment may provide desirable stereo viewing. The orientation of a portal may be fixed such that a horizon of the portal content is level with the horizon of the user's real-world environment.

A portal may be positioned at a position along a current or expected viewing direction of the user and may be positioned at a distance along such a viewing direction closer to or farther from the viewer based on an intended/desired level of immersion, e.g., where a relatively closer position provides a more immersive experience and relatively farther position provides a more casual viewing experience. Scene motion (during capture time) may be used as an indication of an intended/desired level of immersive, e.g. a stable tripod-mounted capture may be detected and determined to be indicative of a high intended level of immersion while a head-mounted capture with lots of capture motion may be detected and determined to indicate a low intended level of immersion. The intended/desired amount of immersion may be based on additional or alternative factors such as available space, user preferences, type of environment, the presence of other people, etc. The size of the portal may additionally be adjusted based on the intended/desired level of immersion.

A portal height may be determined to align the portal with the user's eye level (e.g. positioning a center of portal in line with user's eye level) or it can be placed in relation with the user's environment (or the detected environment within the recorded content). For example, the real-world floor may be aligned with the detected floor in the captured content.

In some implementations, a portal is positioned based on determining a direction that a user is facing, the open space within the user's environment, and/or other objects that may be obstructed by the portal at various potential positions. In one example, if possible given open space or obstruction constraints, a portal is positioned directly in front of where a user is facing at a predetermined distance. If such positioning is not possible given open space or obstruction constraint, the portal may be positioned as close to such a position as possible.

In some implementations, a portal is positioned based on the positioning of the capturing device that captured to portal content. For example, the distance of a capturing device that was close to the ground surface (e.g., two feet above) during capture may be used to position a portal at a similar relatively close distance (e.g., 2 feet) to a floor surface in the viewing environment. Such placement may improve the realism and/or provide a more natural and desirable user viewing experience.

In some implementations, the electronic device may stabilize and align the 3D image content in the portal with the 3D environment, e.g., to compensate for camera movement during capture. For example, the 3D image content may include someone capturing stereo video while running. By providing the stereo video content within the portal, methods described herein can stabilize the unstable video (e.g., a runner's video) within the portal, to reduce motion sickness of a viewer watching the video content within the portal.

In some implementations, the surface of the portal (e.g., the half-sphere that includes the projection of the 3D image) may provide stereo texture and change orientation to be oriented towards the user as the user moves around the 3D environment. For example, as a user walks around the 3D environment, the portal can change in appearance (e.g., size, shape, etc.) and/or move with the user as he or she moves around the physical environment. The 3D environment may be the physical environment (e.g., pass through video on an HMD), or the 3D environment may include a representation of the physical environment (XR environment).

In some implementations, processes described herein change a level of immersion based on a user position relative to the location of the projection of the 3D image (e.g., close to or within the half-sphere). For example, in some implementations, the method 800 further includes determining a positional relationship (e.g., distance, orientation, etc.) of a viewpoint (e.g., a user's head or device) relative to the projection of the 3D image in the 3D environment and changing a level of immersion based on the positional relationship. In some implementations, determining the positional relationship involves determining that the viewer is within a predetermined distance of the visual content. In some implementations, determining the positional relationship involves determining that the viewer is within an area associated with the visual content. The positional relationship may be within or outside of a threshold distance from the visual content, within a sphere determined based on the visual content, etc. In some implementations, the position of a viewer is tracked over time while visual content is presented in the 3D environment. Thus, as the viewer moves within the environment or the projection of the 3D image moves within the environment, the relative positioning between the viewer and visual content is tracked, e.g., at each frame or instant in time, every 5 frames or instants in time, etc. In some implementations, if the user is located within a threshold distance of the projection (e.g., nearly within the half-sphere, such as within a three foot distance threshold), the projection of the 3D image may change from a half-sphere view (e.g., aka "snow globe view") to a full immersion view (e.g., a full screen view such as example view 700 of FIG. 7). The full immersion view may include a complete immersive view while wearing an HMD (e.g., a 180° view that involves the entire perceptive view for the user). For example, as a user gets closer to the portal (e.g., the projection of the 3D image), the portal may increase in size. Additionally, if a user walks into the location of the portal, the user may be fully immersed within the stereo photo/video content.

In some implementations, processes described herein adjust the projection of the 3D image to improve user comfort. For example, adjusting the perceived stereo parallax on a principal object when viewing a stereo photo in a non-life-size-mode (aka a "snow globe effect"). In particular, in some implementations, the method 800 further includes adjusting the projection to control parallax. In some implementations, adjusting the projection to control parallax is based on a gaze direction of a user of the electronic device relative to the position of the 3D image within the 3D environment. For example, determine which portion of the scene a user wants the least disparity based on his or her gaze. The effective disparity may be based on depth information of the captured image/video, screen size of the electronic device 120, and a user distance relative to the portal (e.g., the projection of the 3D image—visual content 285). In some implementations, adjusting the projection to control parallax includes determining a metric based on depth of content of the 3D image, and performing a pixel shift, warp, or movement of the projection of the 3D image based on the metric.

In some implementations, the method 800 further includes adjusting the projection of the 3D image to reduce pixel disparity between the left and right eye viewpoints. For example, a convergence angle between the left eye viewpoint and the right eye viewpoint may be determined based on a user's gaze. The convergence angles may be determined based on a three-point triangle of a user's position, a projected 3D point of a pixel on an object for a left eye, and a projected 3D point of a pixel on an object for a right eye. As the two projected 3D points for the left and right eye view moves, the angle may become smaller or larger. The object may include the 3D image projection (e.g., the half-sphere), or the object may include a particular object within the projection of the 3D image that the user is focused on (e.g., a person).

Figure 9:
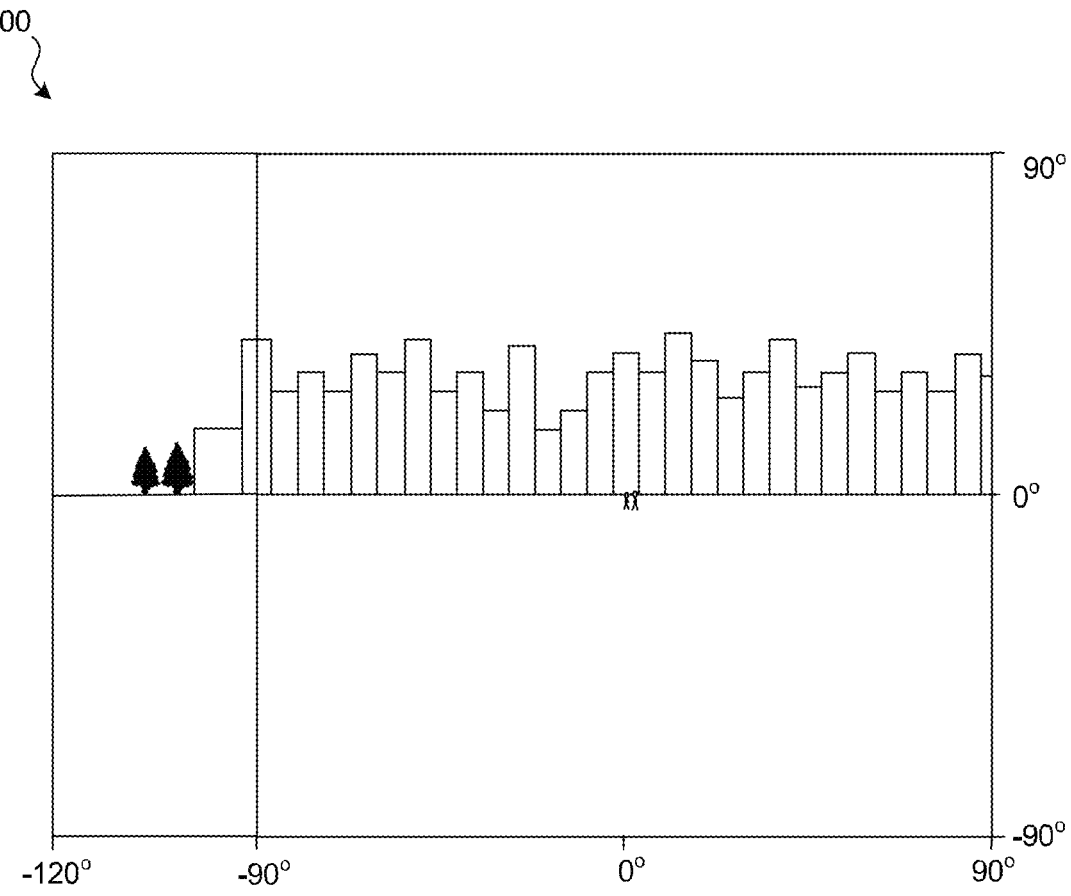
FIG. 9 illustrates an example of an equirectangular representation of an image of FIG. 3 with additional content in accordance with some implementations.

FIG. 9 illustrates an example of an equirectangular representation 900 of an image in accordance with some implementations. In particular, the equirectangular representation 900 represents an example image of two people with a background of a city (e.g., a group of buildings). Additionally, in comparison to equirectangular representation 300 of FIG. 3, the equirectangular representation 900 includes additional content (e.g., two trees to the left of the group of buildings). The additional content of the equirectangular representation 900 is outside of a 180° field of view (e.g., −90° to 90°).

Figure 10A:
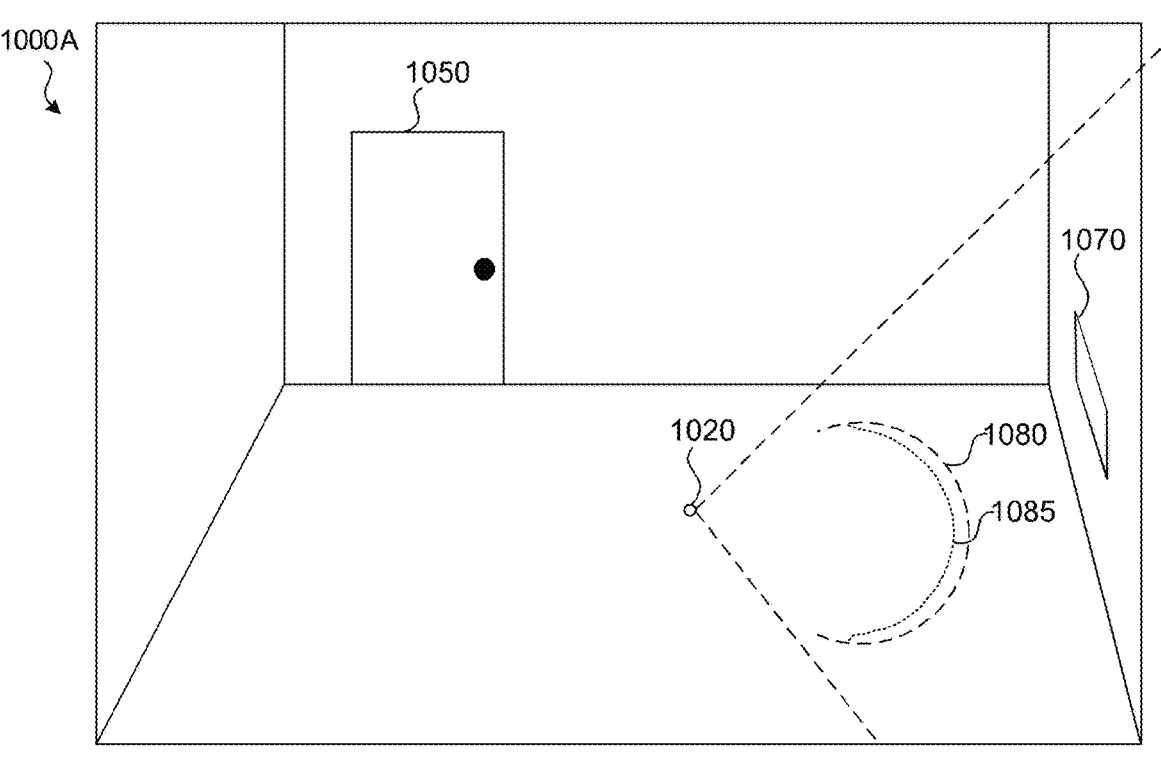
FIG. 10A illustrates an exemplary 3D environment generated based on the physical environment of FIG. 1 and a projection of a 3D image within the 3D environment in accordance with some implementations.

FIG. 10A illustrates an exemplary 3D environment 1000A generated based on the physical environment 100 of FIG. 1 and a projection of a 3D image within the 3D environment 1000A. The 3D environment 1000A includes representations 1050 and 1070 of the door 150 and wall hanging 170, respectively, of the physical environment 100. The 3D environment 1000A also includes visual content 1085 that is displayed to form a virtual shape 1080 (e.g., a 3D virtual shape such as a half-sphere, aka a "snow globe" view). The visual content 1085 being displayed to form the virtual shape 1080 constitutes the portal (e.g., a projection of an image), as discussed herein. Additionally, in comparison to the 3D environment 200 of FIG. 2, the 3D environment 1000A shows viewer position 1020 to be closer to the virtual shape 1080 than viewer position 220 to the virtual shape 280.

Figure 10B:
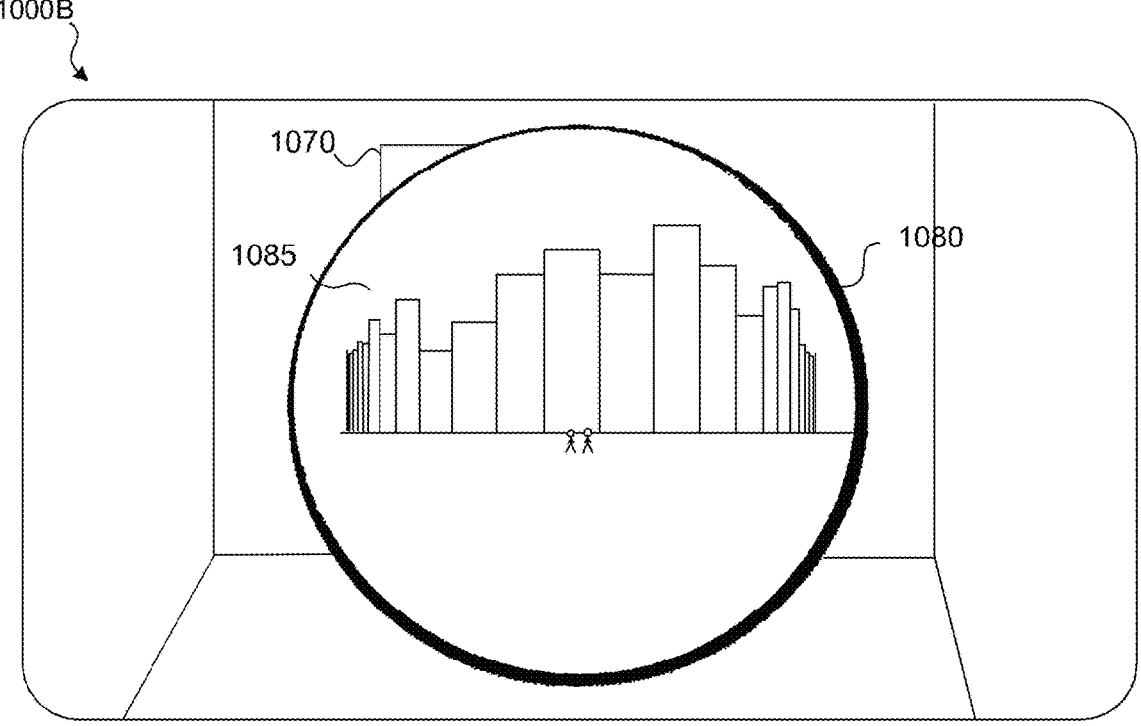
FIG. 10B illustrates an example view of the image of FIG. 10A in accordance with some implementations.

FIG. 10B illustrates an example view 1000B of the representation 900 of FIG. 9 provided by the device of FIG. 2, in accordance with some implementations. For example, the representation 900 is illustrated as visual content 1085 that is displayed on a surface of a virtual shape 1080 (e.g., a 3D virtual shape such as a half-sphere, aka a "snow globe" view) on a display of an electronic device (e.g., electronic device 120). For example, the example view 1000B represents an example viewpoint of the user 120 that he or she would be viewing in FIG. 10A of an image (e.g., visual content 1085, i.e., an image of two people with a background of a city) provided within a portal (e.g., virtual shape 1080). In particular, based on the current view from viewpoint 1020, only 180° of the content 1085 is displayed (e.g., thus the trees to the left of buildings are not shown).

Figure 11A:
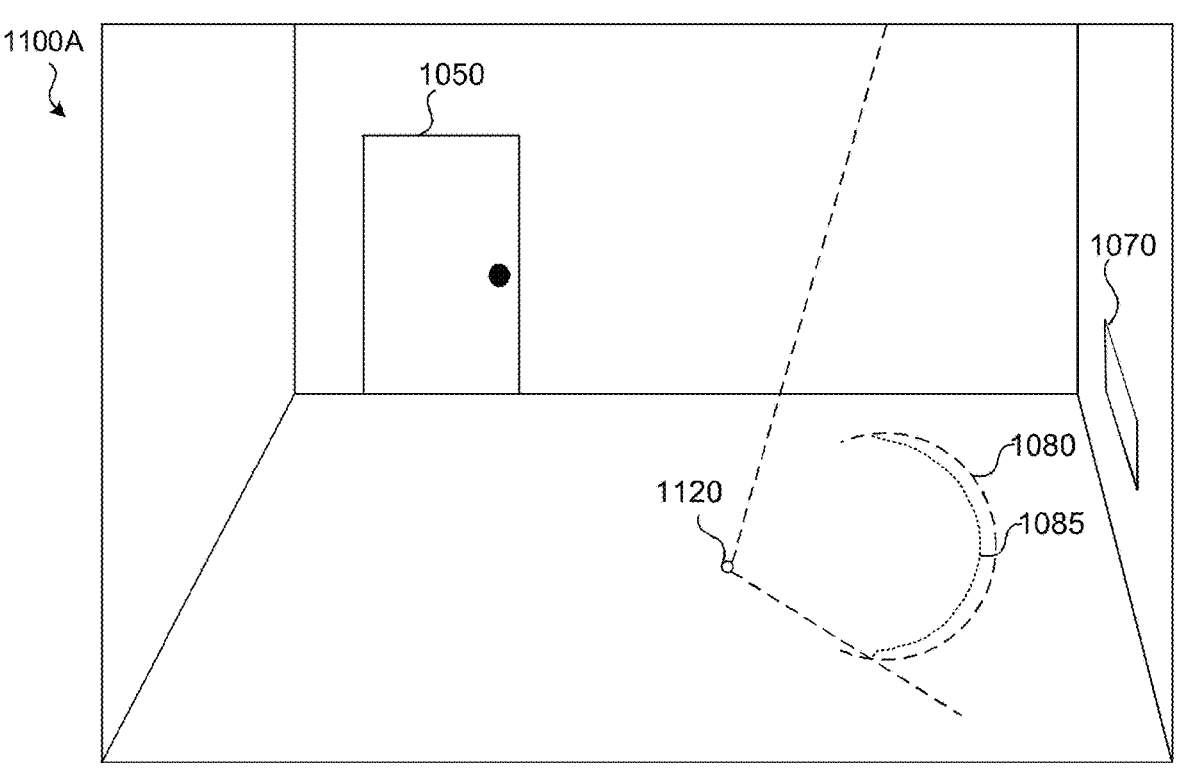
FIG. 11A illustrates an exemplary 3D environment generated based on the physical environment of FIG. 1 and a projection of a 3D image within the 3D environment in accordance with some implementations.

FIG. 11A illustrates an exemplary 3D environment 1100A generated based on the physical environment 100 of FIG. 1 and a projection of a 3D image within the 3D environment 1100A. The 3D environment 1100A is the same environment as 3D environment 1000A of FIG. 10A, except that viewpoint 1120 is from a different viewpoint (e.g., a different perspective) than viewpoint 1020. For example, the viewpoint 1120 illustrates a user that either moved the device or turned his or her head while wearing an HMD. For example, the user wants to look at additional content not currently in view of the visual content 1085 thus has made a movement to look at the outer edge of the visual content.

Figure 11B:
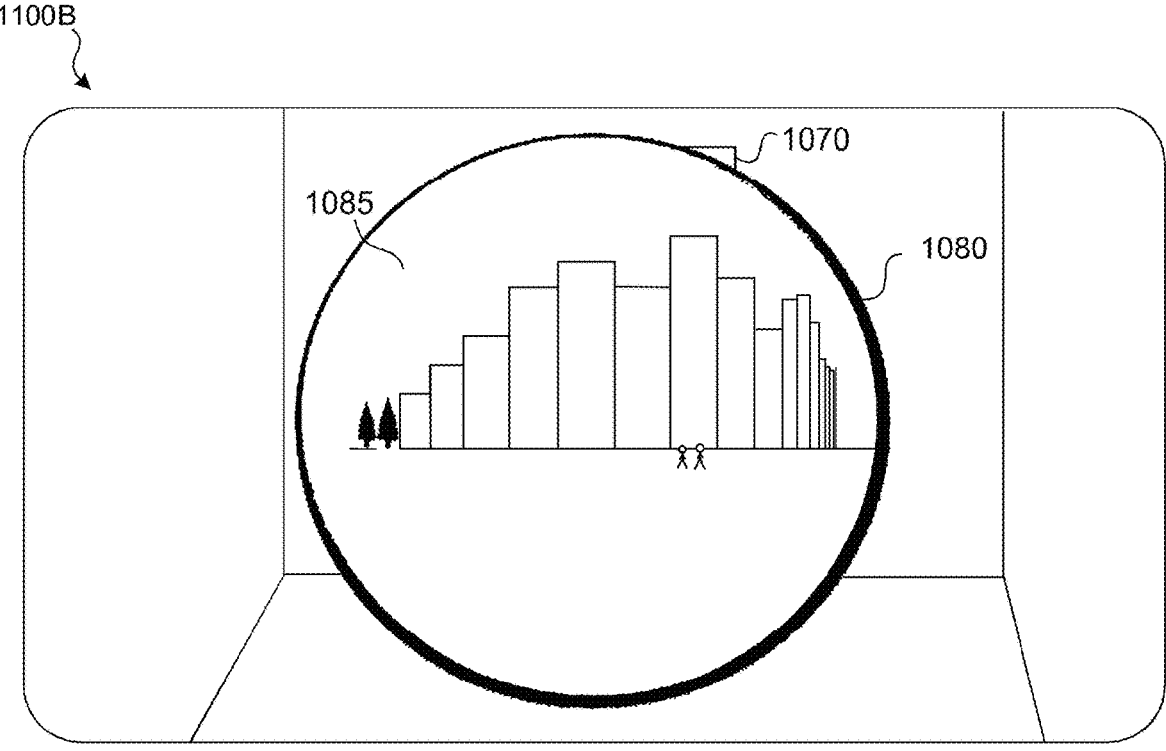
FIG. 11B illustrates an example view of the image of FIG. 11A in accordance with some implementations.

FIG. 11B illustrates an example view 1100B of the representation 900 of FIG. 9 provided by the device of FIG. 2, in accordance with some implementations. For example, the representation 900 is illustrated as visual content 1085 that is displayed on a surface of a virtual shape 1080 (e.g., a 3D virtual shape such as a half-sphere, aka a "snow globe" view) on a display of an electronic device (e.g., electronic device 120). For example, the example view 1100B represents an example viewpoint of the user 120 that he or she would be viewing in FIG. 11A of an image (e.g., visual content 1085, i.e., an image of two people with a background of a city) provided within a portal (e.g., virtual shape 1080). In particular, based on the current view from viewpoint 1120 (e.g., the user looking to the left of the view of the content 1085), the user is provided additional content of the content 1085 then was displayed in example view 1000B. Thus, the trees to the left of buildings are now displayed to the user based on the detected movement (e.g., the viewpoint 1120 has changed from viewpoint 1020).

FIG. 12 is a flowchart illustrating an exemplary method 1200. In some implementations, a device such as electronic device 120 (FIG. 1) performs the techniques of method 1200 to provide a view of a 3D environment including a projection of a 3D image (e.g., a virtual "portal") within the 3D environment. In some implementations, the techniques of method 1200 are performed on a mobile device, desktop, laptop, HMD, ear-mounted device or server device. In some implementations, the method 1200 is performed by processing logic, including hardware, firmware, software, or a combination thereof. In some implementations, the method 1200 is performed on a processor executing code stored in a non-transitory computer-readable medium (e.g., a memory).

At block 1202, the method 1200 obtains a 3D image. The 3D image may be one or more images, a video, an animation, or other visible content that is recorded or created. The 3D image may be non-linear content captured from a camera such as a camera with a fisheye lens. Such a camera may capture non-linear content corresponding to the shape of the lens without flattening the content and this non-linear content may be positioned in a 3D environment, e.g., on a corresponding non-planar (e.g., curved, semi-spherical, etc.) surface of a shape. For example, the content may be displayed on a portion of an inside or outside of an approximately spherical shape (which may be invisible). Non-linear visual content may be captured and displayed without distortion or adjustment that would otherwise be used to present the content on a planar surface.

In some implementations, the 3D image includes a stereoscopic image pair including left eye content corresponding to a left eye viewpoint and right eye content corresponding to a right eye viewpoint. In some implementations, the 3D image may include a stereo image pair or stereo video content (e.g., 180° stereo image content) stored as equirectangular projections. For example, as illustrated in FIG. 5, a stereo image pair of 3D images is displayed to the user (e.g., view 500a is a left-eye view and view 500b is a right-eye view). In some implementations, spatialized depth data may also be obtained and used to enable a spatialized view. In some implementations, the 3D image includes a stereo photograph, a stereogram, flickering stereo images, a random dot stereogram, an anaglyph, a lenticular image, or the like. In some implementations, the 3D image may be any stereo image pair, e.g., such that differences between a right eye view and a left eye view enable the viewer to perceive depth within the image content that is depicted at the portal. For example, the 3D image may be any type of stereo image pair such as 180° half sphere, rectilinear 90°, equirectangular projections, and the like, such that any image content with a known projection will work, as long as the content includes a stereo pair.

At block 1204, the method 1200 generates a projection of the 3D image within a 3D environment by projecting portions (pixels) of the 3D image to form a shape (e.g., a half-sphere) within the 3D environment, where the 3D environment includes additional content separate from the 3D image. For example, additional content separate from the 3D image by include virtual shape 280. In some implementations, the shape (e.g., virtual shape 280) is based on an angle of view of the 3D image (e.g., a half-sphere is used for a 180° angle of view). The projection of the 3D image (e.g., visual content 285) is sometimes referred to herein as a portal (e.g., aka a "snow globe" view).

At block 1206, the method 1200 provides a view of the 3D environment including the projection of the 3D image. The 3D environment may be any type of environment including XR environments that include representations of real or virtual objects. For example, as illustrated in view 400 of FIG. 4, a view of an electronic device provides a view of the 3D environment (e.g., a viewpoint towards the representation 270 of the wall hanging 170 of example environment 100) which includes the projection of an image (e.g., visual content 285) within a portal (e.g., virtual shape 280).

In some implementations, the method 1200 further includes determining a position to project the 3D image within the 3D environment based on a viewpoint of the view of the 3D environment. For example, the portal (e.g., virtual shape 280) may be world-locked and fixed to a particular location within the 3D environment, or may be head-locked and fixed to a particular viewpoint of the user (e.g., while wearing an HMD, the portal stays at the same viewpoint as the user moves around the 3D environment). In some implementations, a position of the 3D image within the 3D environment is constant as a viewpoint of the view of the 3D environment changes (e.g., world-locked positioning). For example, as the user moves around, the shape (e.g., half-sphere, aka "snow globe") stays in a fixed position. In some implementations, an orientation of the 3D image changes to face a viewpoint as a viewpoint of the view of the 3D environment changes. For example, the 3D image changes orientation to constantly face the user as the user walks around the real-world, physical environment (e.g., head-locked positioning).

In some implementations, the electronic device may stabilize and align the 3D image content in the portal with the 3D environment, e.g., to compensate for camera movement during capture. For example, the 3D image content may include someone capturing stereo video while running. By providing the stereo video content within the portal, methods described herein can stabilize the unstable video (e.g., a runner's video) within the portal, to reduce motion sickness of a viewer watching the video content within the portal.

In some implementations, the surface of the portal (e.g., the half-sphere that includes the projection of the 3D image) may provide stereo texture and change orientation to be oriented towards the user as the user moves around the 3D environment. For example, as a user walks around the 3D environment, the portal can change in appearance (e.g., size, shape, etc.) and/or move with the user as he or she moves around the physical environment. The 3D environment may be the physical environment (e.g., pass through video on an HMD), or the 3D environment may include a representation of the physical environment (XR environment).

In some implementations, processes described herein change a level of immersion based on a user position relative to the location of the projection of the 3D image (e.g., close to or within the half-sphere). For example, in some implementations, the method 1200 further includes determining a positional relationship (e.g., distance, orientation, etc.) of a viewpoint (e.g., a user's head or device) relative to the projection of the 3D image in the 3D environment and changing a level of immersion based on the positional relationship. In some implementations, determining the positional relationship involves determining that the viewer is within a predetermined distance of the visual content. In some implementations, determining the positional relationship involves determining that the viewer is within an area associated with the visual content. The positional relationship may be within or outside of a threshold distance from the visual content, within a sphere determined based on the visual content, etc. In some implementations, the position of a viewer is tracked over time while visual content is presented in the 3D environment. Thus, as the viewer moves within the environment or the projection of the 3D image moves within the environment, the relative positioning between the viewer and visual content is tracked, e.g., at each frame or instant in time, every 5 frames or instants in time, etc. In some implementations, if the user is located within a threshold distance of the projection (e.g., nearly within the half-sphere, such as within a three foot distance threshold), the projection of the 3D image may change from a half-sphere view (e.g., aka "snow globe view") to a full immersion view (e.g., a full screen view such as example view 700 of FIG. 7). The full immersion view may include a complete immersive view while wearing an HMD (e.g., a 180° view that involves the entire perceptive view for the user). For example, as a user gets closer to the portal (e.g., the projection of the 3D image), the portal may increase in size. Additionally, if a user walks into the location of the portal, the user may be fully immersed within the stereo photo/video content.

In some implementations, processes described herein adjust the projection of the 3D image to improve user comfort. For example, adjusting the perceived stereo parallax on a principal object when viewing a stereo photo in a non-life-size-mode (aka a "snow globe effect"). In particular, in some implementations, the method 1200 further includes adjusting the projection to control parallax. In some implementations, adjusting the projection to control parallax is based on a gaze direction of a user of the electronic device relative to the position of the 3D image within the 3D environment. For example, determine which portion of the scene a user wants the least disparity based on his or her gaze. The effective disparity may be based on depth information of the captured image/video, screen size of the electronic device 120, and a user distance relative to the portal (e.g., the projection of the 3D image—visual content 285). In some implementations, adjusting the projection to control parallax includes determining a metric based on depth of content of the 3D image, and performing a pixel shift, warp, or movement of the projection of the 3D image based on the metric.

In some implementations, the method 1200 further includes adjusting the projection of the 3D image to reduce pixel disparity between the left and right eye viewpoints. For example, a convergence angle between the left eye viewpoint and the right eye viewpoint may be determined based on a user's gaze. The convergence angles may be determined based on a three-point triangle of a user's position, a projected 3D point of a pixel on an object for a left eye, and a projected 3D point of a pixel on an object for a right eye. As the two projected 3D points for the left and right eye view moves, the angle may become smaller or larger. The object may include the 3D image projection (e.g., the half-sphere), or the object may include a particular object within the projection of the 3D image that the user is focused on (e.g., a person).

In some implementations, the projection of the 3D image depicts a portion of the 3D image such that remaining portions of the 3D image are cropped out of the projection. For example, as illustrated in FIG. 9, the equirectangular representation 900, when compared to equirectangular representation 300, includes additional content outside of the 180° view. Thus, the projection of the 3D image may be of a cropped 3D image such that there is additional content not being displayed within the sphere (e.g., the trees to the left of the buildings).

At block 1208, the method 1200 determines a positional relationship of a viewpoint of the view relative to the projection of the 3D image in the 3D environment. For example, determining a positional relationship may include determining a distance, an orientation, etc., of a viewpoint from a user's head (e.g., user 102) or a viewpoint from the device (e.g., device 120). The positional relationship can be determined (e.g., a location) relative to the projection of the 3D image in the 3D environment (e.g., a distance from a viewer position 220 to the projection on the visual shape 280, as illustrated in FIG. 2).

At block 1210, the method 1200 changes the projection of the 3D image within the 3D environment based on the positional relationship. For example, changing the projection of the 3D image within the 3D environment may include looking at additional content in the 3D photo not currently in view (e.g., the trees to the left of the buildings in the equirectangular representation 900) based on the positional relationship (e.g., detected motion of the head or device).

In some implementations, changing the projection of the 3D image includes causing some of the remaining portions of the 3D image to be depicted based on the positional relationship satisfying a first criterion. For example, revealing cropped portions (e.g., the trees to the left of the buildings in the equirectangular representation 900) in response to movement of the user (e.g., along with the planar homography warp) when the change in relationship falls within an acceptable range. For example, detecting of movement of the head of a user (e.g., if the user is wearing an HMD) or detecting the movement of the device, such that the viewpoint of the user or device appears to be looking outside of the edge of the currently displayed 3D photo (e.g., the user is trying to see if there is additional image data outside of the current view).

In some implementations, changing the projection of the 3D image includes providing a visual effect to the projection of the 3D image based on the positional relationship satisfying a second criterion. For example, the criterion for providing a visual effect may be if the user moves laterally beyond a threshold distance where the parallax illusion breaks, a visual effect may be provided. Additionally, or alternatively, the criterion for providing a visual effect may be when the change in the relationship falls outside of an acceptable range. For example, visual effects may be provided within a stereo image or video content (e.g., within the shape 280) based on head movements to further reduce motion sickness (e.g., creating a faux parallax for 3D photos based on a correspondence to head motion, such as creating an illusion). In some implementations, the visual effect includes blurring at least a portion of the projection of the 3D image, fading out content of the projection of the 3D image, or converting at least a portion of color content of the projection of the 3D image to grayscale. In some implementations, the projection of the 3D image includes a stereoscopic view of the 3D image, and the visual effect includes a change from the stereoscopic view to a monoscopic view of the 3D image.

In some implementations, the visual effect is based on a rate of change of the positional relationship. For example, the rate of change of the positional relationship may be based on a speed threshold. For example, if the head moves too quickly because the user wants to look away from the projection (e.g., the 3D photo presented in the snow globe), a visual effect may be displayed on the 3D photo. For example, the projection is world locked to a particular location, and the user is interrupted and wants to look over to another portion of the room (e.g., another person enters the room), the projection could be blurred, faded, changed from the stereoscopic view to a monoscopic view, etc. The user's focus (e.g., eye gaze characteristics) is no longer towards the projection, thus the image quality (e.g., frame rate) can be reduced to improve processing capabilities of the system since the user is not currently focused on 3D image. This visual effect also reduces on the user's motion sickness. Additionally, different visual effects may be included, based on these detected head motions (e.g., the entire texture is changing based on the movement and maybe mapped to texture animation, panning to texture, rotational warp (rotation in texture space), and the like).

In some implementations, the changing of the projection of the 3D image is based on applying a warp to a left frame and a right frame of the 3D image using a fixed depth. For example, the visual effects that are provided to change the projection of the 3D image may be based on applying a fixed depth to the motion (e.g., planar homography) for an image-to-image operation.

Figure 13:
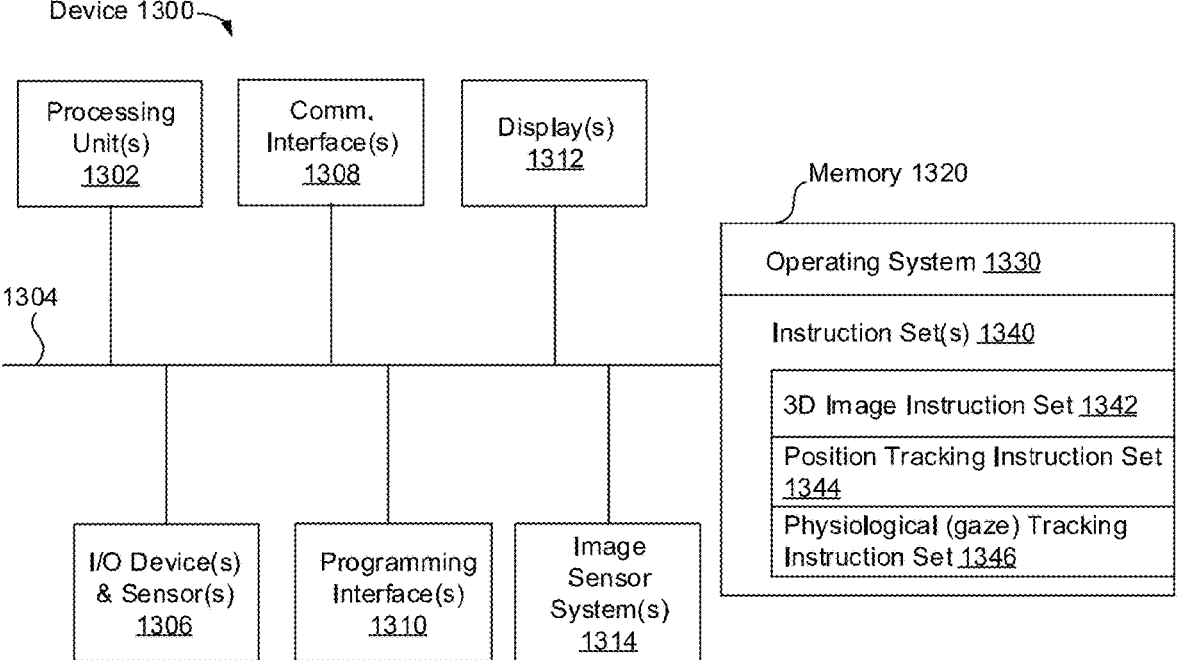
FIG. 13 is an example device in accordance with some implementations.

FIG. 13 is a block diagram of an example device 1300. Device 1300 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1300 includes one or more processing units 1302 (e.g., microprocessors, ASICs, FPGAs, GPUs, CPUs, processing cores, and/or the like), one or more input/output (I/O) devices and sensors 1306, one or more communication interfaces 1308 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, and/or the like type interface), one or more programming (e.g., I/O) interfaces 1310, one or more displays 1312, one or more interior and/or exterior facing image sensor systems 1314, a memory 1320, and one or more communication buses 1304 for interconnecting these and various other components.

In some implementations, the one or more communication buses 1304 include circuitry that interconnects and controls communications between system components. In some implementations, the one or more I/O devices and sensors 1306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1312 are configured to present a view of a physical environment or a graphical environment to the user. In some implementations, the one or more displays 1312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 1312 correspond to diffractive, reflective, polarized, holographic, etc. wave-guide displays. In one example, the device 1300 includes a single display. In another example, the device 1300 includes a display for each eye of the user.

In some implementations, the one or more image sensor systems 1314 are configured to obtain image data that corresponds to at least a portion of the physical environment 105. For example, the one or more image sensor systems 1314 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1314 further include illumination sources that emit light, such as a flash. In various implementations, the one or more image sensor systems 1314 further include an on-camera image signal processor (ISP) configured to execute a plurality of processing operations on the image data.

In some implementations, the device 120 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 120 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 120.

The memory 1320 includes high-speed random-access memory, such as DRAM, SRAM, DDR RAM, or other random-access solid-state memory devices. In some implementations, the memory 1320 includes non-volatile memory, such as one or more magnetic disk storage devices, optical disk storage devices, flash memory devices, or other non-volatile solid-state storage devices. The memory 1320 optionally includes one or more storage devices remotely located from the one or more processing units 1302. The memory 1320 includes a non-transitory computer readable storage medium.

In some implementations, the memory 1320 or the non-transitory computer readable storage medium of the memory 1320 stores an optional operating system 1330 and one or more instruction set(s) 1340. The operating system 1330 includes procedures for handling various basic system services and for performing hardware dependent tasks. In some implementations, the instruction set(s) 1340 include executable software defined by binary information stored in the form of electrical charge. In some implementations, the instruction set(s) 1340 are software that is executable by the one or more processing units 1302 to carry out one or more of the techniques described herein.

The instruction set(s) 1340 includes a 3D image instruction set 1342, position tracking instruction set 1344, and a physiological (gaze) tracking instruction set 1346. The instruction set(s) 1340 may be embodied as a single software executable or multiple software executables.

The 3D image instruction set 1342 is executable by the processing unit(s) 1302 to provide visual content such as one or more images, video, animation, and the like. In some implementations, the 3D image instruction set 1342 is executed to generate a 3D environment, include visual content in the 3D environment, and provide views of the 3D environment including the visual content based on a viewer position. The viewer position may be determined according to the position tracking instruction set 1344 and may be based on a viewer (e.g., user or device) position and movement in a physical environment. Gaze characteristics of a viewer may be determined by the physiological (gaze) tracking instruction set 1346. In some implementations, the 3D image instruction set 1342 is executed to include visual content on a real or virtual surface in a 3D environment and provide views of the 3D environment including the visual content on the surface based on a viewer position and/or a viewer's gaze direction. The real or virtual surface may correspond to a shape, e.g., a flat plane, a portion of a sphere, a shape that corresponds to image content from which the visual content is created, etc.

The position tracking instruction set 1344 is executable by the processing unit(s) 1302 to track a position of a viewer (e.g., the user or his/her device) relative to a 3D environment. This may involve tracking a position or movement of the viewer in a physical environment. Position, including 2D or 3D coordinate information or orientation, may be tracked based on information from I/O device(s) and sensor(s) 1306 or image sensor system(s) 1314. In some implementations, the position tracking instruction set 1344 is executed to evaluate images of a physical environment, recognize objects in the physical environment, and determine a viewer position relative to the objects in the physical environment. In some implementations, the viewer position is additionally or alternatively tracked using an inertial measurement unit (IMU), an accelerometer, a magnetometer, or a gyroscope. In some implementations, a visual inertial odometry (VIO) technique or a simultaneous localization and mapping (SLAM) technique is applied to track viewer position. In some implementations, position tracking instruction set 1344 implements a machine learning model that uses image data or sensor data to track viewer position.

In some implementations, the physiological tracking (e.g., eye gaze characteristics) instruction set 1346 is executable by the processing unit(s) 1302 to track a user's eye gaze characteristics or other physiological attributes using one or more of the techniques discussed herein or as otherwise may be appropriate. To these ends, in various implementations, the instruction includes instructions and/or logic therefor, and heuristics and metadata therefor.

Although the instruction set(s) 1340 are shown as residing on a single device, it should be understood that in other implementations, any combination of the elements may be located in separate computing devices. Moreover, FIG. 13 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 14:
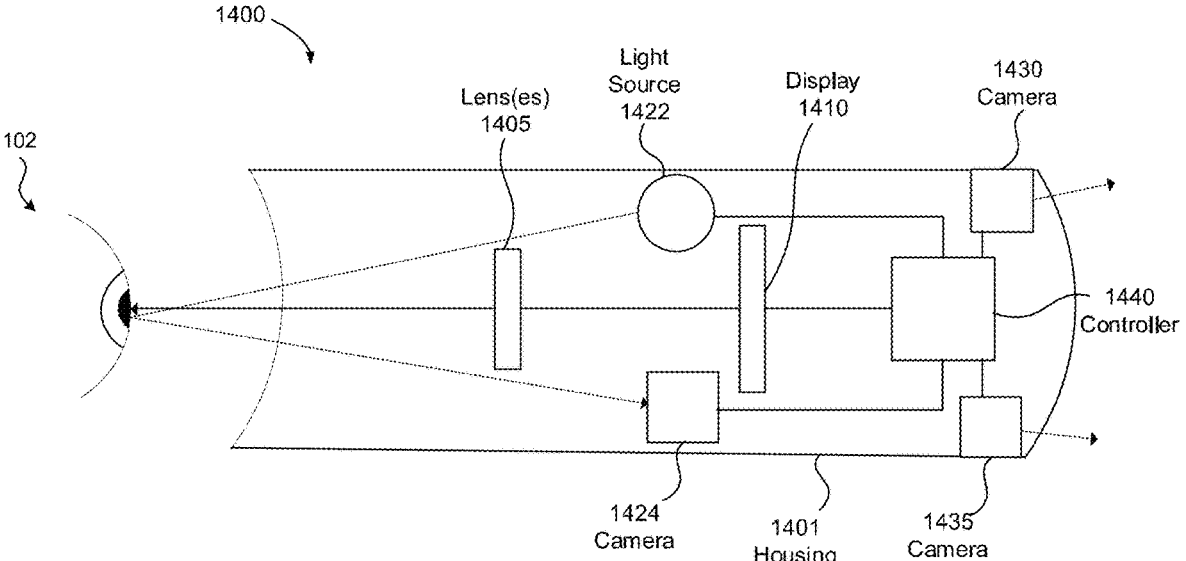
FIG. 14 illustrates an example head-mounted device (HMD) in accordance with some implementations.

FIG. 14 illustrates a block diagram of an exemplary head-mounted device 1400 in accordance with some implementations. The head-mounted device 1400 includes a housing 1401 (or enclosure) that houses various components of the head-mounted device 1400. The housing 1401 includes (or is coupled to) an eye pad (not shown) disposed at a proximal (to the eye(s) of the user 102) end of the housing 1401. In various implementations, the eye pad is a plastic or rubber piece that comfortably and snugly keeps the head-mounted device 1400 in the proper position on the face of the user 102 (e.g., surrounding the eye of the user 102).

The housing 1401 houses a display 1410 that displays an image, emitting light towards or onto the eye of a user 102. In various implementations, the display 1410 emits the light through an eyepiece having one or more lenses 1405 that refracts the light emitted by the display 1410, making the display appear to the user 102 to be at a virtual distance farther than the actual distance from the eye to the display 1410. For the user 102 to be able to focus on the display 1410, in various implementations, the virtual distance is at least greater than a minimum focal distance of the eye (e.g., 7 cm). Further, in order to provide a better user experience, in various implementations, the virtual distance is greater than 1 meter.

The housing 1401 also houses a tracking system including one or more light sources 1422, camera 1424, and a controller 1480. The one or more light sources 1422 emit light onto the eye of the user 102 that reflects as a light pattern (e.g., a circle of glints) that can be detected by the camera 1424. Based on the light pattern, the controller 1480 can determine an eye tracking characteristic of the user 102. For example, the controller 1480 can determine a gaze direction and/or a blinking state (eyes open or eyes closed) of the user 102. As another example, the controller 1480 can determine a pupil center, a pupil size, or a point of regard. Thus, in various implementations, the light is emitted by the one or more light sources 1422, reflects off the eye of the user 102, and is detected by the camera 1424. In various implementations, the light from the eye of the user 102 is reflected off a hot mirror or passed through an eyepiece before reaching the camera 1424.

The display 1410 emits light in a first wavelength range and the one or more light sources 1422 emit light in a second wavelength range. Similarly, the camera 1424 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 1410 by looking at it), provide foveated rendering (e.g., present a higher resolution in an area of the display 1410 the user 102 is looking at and a lower resolution elsewhere on the display 1410), or correct distortions (e.g., for images to be provided on the display 1410). In various implementations, the one or more light sources 1422 emit light towards the eye of the user 102 which reflects in the form of a plurality of glints.

In various implementations, the camera 1424 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1424 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, head-mounted device 1400 includes externally facing sensors (e.g., camera 1430 and camera 1435) for capturing information from outside of the head-mounted device 1400. For example, to capture image data of the physical environment that the user 102 is viewing. The image data can include light intensity image data and/or depth data. For example, camera 1430 (e.g., sensor 122 of FIG. 1) may be a video camera for capturing RGB data, and camera 1435 (e.g., sensor 124 of FIG. 1) may be a depth sensor (e.g., a structured light, a time-of-flight, or the like) for capturing depth data.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combination of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device having a processor:

obtaining a three-dimensional (3D) image, wherein the 3D image comprises a view of a first 3D environment;

generating a projection of the 3D image within a second 3D environment based on a positional relationship of a viewpoint of the view relative to the projection of the 3D image in the second 3D environment, wherein the projection is generated by projecting portions of the 3D image to form a shape having a non-planar surface within the second 3D environment, wherein the second 3D environment is different than the first 3D environment and comprises additional content separate from the 3D image, wherein the shape comprises at least a portion of a sphere; and providing a view of the second 3D environment including the projection of the first 3D environment within the 3D image, wherein a level of immersion between the projection of the 3D image within the view of the second 3D environment is changed based on detecting a change in the positional relationship, wherein changing the level of immersion comprises changing the view of the projection of the 3D image from a perspective of an outside view of the shape to a perspective from an inside view of the shape.

2. The method of claim 1, wherein a position of the projection of the 3D image within the second 3D environment is constant as a viewpoint of the view of the first 3D environment changes.

3. The method of claim 1, wherein an orientation of the projection of the 3D image changes to face a viewpoint as a viewpoint of the view of the first 3D environment changes.

4. The method of claim 1, wherein the shape is based on an angle of view of the 3D image.

5. The method of claim 4, wherein adjusting the projection to control parallax is based on a gaze direction of a user of the electronic device relative to a position of the projection of the 3D image within the second 3D environment.

6. The method of claim 4, wherein adjusting the projection to control parallax comprises:

determining a metric based on depth of content of the 3D image; and performing a pixel shift, warp, or movement of the projection of the 3D image based on the metric.

7. The method of claim 4, further comprising further adjusting the projection to reduce pixel disparity between a left eye viewpoint and a right eye viewpoint.

8. The method of claim 1, wherein changing a level of immersion based on the positional relationship comprises changing a view from an inside view of the projection of the 3D image to an outside view of the projection of the 3D image.

9. The method of claim 1, wherein the 3D image comprises 360 degree content, and changing a level of immersion based on the positional relationship comprises changing from a first view that comprises a portion of the projection of the 3D image when the positional relationship of the viewpoint is outside of the projection of the 3D image to a second view that comprises all of the projection of the 3D image when the positional relationship of the viewpoint is inside of the projection of the 3D image.

10. The method of claim 1, further comprising:

determining a positional relationship of a viewpoint of the view relative to the projection of the 3D image in the second 3D environment; and changing the projection of the 3D image within the second 3D environment based on the positional relationship.

11. The method of claim 10, wherein changing the projection of the 3D image comprises causing some of the remaining portions of the 3D image to be depicted based on the positional relationship satisfying a first criterion.

12. The method of claim 10, wherein changing the projection of the 3D image comprises providing a visual effect to the projection of the 3D image based on the positional relationship satisfying a second criterion.

13. The method of claim 12, wherein the visual effect comprises blurring at least a portion of the projection of the 3D image, fading out content of the projection of the 3D image, or converting at least a portion of color content of the projection of the 3D image to grayscale.

14. The method of claim 12, wherein the projection of the 3D image comprises a stereoscopic view of the 3D image, and the visual effect comprises a change from the stereoscopic view to a monoscopic view of the 3D image.

15. The method of claim 12, wherein the visual effect is based on a rate of change of the positional relationship.

16. The method of claim 10, wherein the changing of the projection of the 3D image is based on applying a warp to a left frame and a right frame of the 3D image using a fixed depth.

17. The method of claim 1, wherein a 3D position of the projection of the 3D image within the second 3D environment comprises a fixed 3D location with respect to the view of the second 3D environment.

18. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining a three-dimensional (3D) image, wherein the 3D image comprises a view of a first 3D environment;
generating a projection of the 3D image within a second 3D environment based on a positional relationship of a viewpoint of the view relative to the projection of the 3D image in the second 3D environment, wherein the projection is generated by projecting portions of the 3D image to form a shape having a non-planar surface within the second 3D environment, wherein the second 3D environment is different than the first 3D environment and comprises additional content separate from the 3D image, wherein the shape comprises at least a portion of a sphere; and
providing a view of the second 3D environment including the projection of the first 3D environment within the 3D image, wherein a level of immersion between the projection of the 3D image within the view of the second 3D environment is changed based on detecting a change in the positional relationship, wherein changing the level of immersion comprises changing the view of the projection of the 3D image from a perspective of an outside view of the shape to a perspective from an inside view of the shape.

19. A non-transitory computer-readable storage medium storing program instructions executable on a device to perform operations comprising:
obtaining a three-dimensional (3D) image, wherein the 3D image comprises a view of a first 3D environment;
generating a projection of the 3D image within a second 3D environment based on a positional relationship of a viewpoint of the view relative to the projection of the 3D image in the second 3D environment, wherein the projection is generated by projecting portions of the 3D image to form a shape having a non-planar surface within the second 3D environment, wherein the second 3D environment is different than the first 3D environment and comprises additional content separate from the 3D image, wherein the shape comprises at least a portion of a sphere; and
providing a view of the second 3D environment including the projection of the first 3D environment within the 3D image, wherein a level of immersion between the projection of the 3D image within the view of the second 3D environment is changed based on detecting a change in the positional relationship, wherein changing the level of immersion comprises changing the view of the projection of the 3D image from a perspective of an outside view of the shape to a perspective from an inside view of the shape.

* * * * *